United States Patent
Yamaguchi et al.

(10) Patent No.: US 7,020,664 B1
(45) Date of Patent: Mar. 28, 2006

(54) FILE MANAGEMENT APPARATUS AND METHOD

(75) Inventors: Tomoko Yamaguchi, Aichi-ken (JP); Toshio Mizuno, Nagoya (JP); Motoshi Suzuki, Aichi-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 495 days.

(21) Appl. No.: 09/723,972

(22) Filed: Nov. 28, 2000

(30) Foreign Application Priority Data

Nov. 30, 1999 (JP) .............................. 11-340053

(51) Int. Cl.
G06F 12/00 (2006.01)

(52) U.S. Cl. ...................................... 707/200

(58) Field of Classification Search .............. 707/1–10, 707/100–104.1, 200, 201, 203; 705/1, 28, 705/29; 706/900, 935, 902; 709/200, 217–219; 715/500, 505, 506, 513, 530, 961, 965, 966, 715/968; 345/961, 965, 966, 968
See application file for complete search history.

(56) References Cited

U.S. PATENT DOCUMENTS

| | | | | |
|---|---|---|---|---|
| 4,218,765 A * | 8/1980 | Kinkade | ...................... | 367/45 |
| 4,873,630 A * | 10/1989 | Rusterholz et al. | ............ | 712/3 |
| 5,787,414 A * | 7/1998 | Miike et al. | .................... | 707/2 |
| 5,966,704 A * | 10/1999 | Furegati et al. | ................. | 707/3 |
| 6,064,676 A * | 5/2000 | Slattery et al. | ............. | 370/412 |
| 6,119,144 A | 9/2000 | Fujita et al. | ................ | 709/203 |
| 6,121,654 A | 9/2000 | Lakharev | ..................... | 257/315 |
| 6,460,036 B1 * | 10/2002 | Herz | ........................... | 707/10 |
| 6,546,192 B1 * | 4/2003 | Hisatomi et al. | ............. | 386/70 |

\* cited by examiner

*Primary Examiner*—Greta Robinson
*Assistant Examiner*—Harold E. Dodds, Jr.

(57) ABSTRACT

Upon receipt of a segment name obtainment request, the segment name generation unit 104 generates a segment name composed of (1) a file name of a file to which the segment belongs and (2) a number indicating a serial number of the segment in the file. Upon receipt of an access request specifying a segment name, the segment identification unit 119 refers to the segment name to detect the file name and the serial number of the segment in the detected file. The segment position detection unit 106 then refers to the file information storage unit 102 and the segment information storage unit 103 to detect a position where a segment is to be accessed.

11 Claims, 35 Drawing Sheets

FIG. 4

| FILE NAME | STORAGE POSITION | CREATION DATE |
|---|---|---|
| Sports | 004 | 99/08/27 13:52:10 |
| Quiz | 126 | 99/08/31 11:04:02 |

FIG. 5

| SPORTS FILE | | |
|---|---|---|
| SEGMENT | START OFFSET ADDRESS (BYTE) | SEGMENT LENGTH (BYTE) |
| SEGMENT 1 | 0 | 20M |
| SEGMENT 2 | 20M | 50M |
| SEGMENT 3 | 70M | 40M |
| UNASSIGNED SPACE | 110M | 40M |
| QUIZ FILE | | |
| SEGMENT | START OFFSET ADDRESS (BYTE) | SEGMENT LENGTH (BYTE) |
| SEGMENT 1 | 0 | 40M |
| SEGMENT 2 | 60M | 30M |
| UNASSIGNED SPACE | 40M | 20M |
| UNASSIGNED SPACE | 90M | 60M |

FIG. 6

| SEGMENT NAME |
|---|
| = FILE NAME OF A FILE TO WHICH A SEGMENT BELONGS + SERIAL NUMBER OF SEGMENT IN THE FILE ASSIGNED IN ORDER OF STORAGE IN THE FILE |

FIG. 7

| FILE | SEGMENT | SEGMENT NAME |
|---|---|---|
| Sports | SEGMENT 1 | Sports 1 |
|  | SEGMENT 2 | Sports 2 |
|  | SEGMENT 3 | Sports 3 |
| Quiz | SEGMENT 1 | Quiz 1 |
|  | SEGMENT 2 | Quiz 2 |

FIG. 9

```
%ftp PC12
 ftp>dir
    [.]            [..]           Sports 1
  Sports 2       Sports 3         Quiz 1
  Quiz 2
```

FIG. 10

```
  ftp>get Sports 2
File Transfer Succeed
```

FIG. 17

| QUIZ FILE | | |
|---|---|---|
| SEGMENT | START OFFSET ADDRESS (BYTE) | SEGMENT LENGTH (BYTE) |
| SEGMENT 1 | 0 | 55M |
| SEGMENT 2 | 60M | 30M |
| UNASSIGNED SPACE | 90M | 60M |

FIG. 19

| SPORTS FILE | | |
|---|---|---|
| SEGMENT | START OFFSET ADDRESS (BYTE) | SEGMENT LENGTH (BYTE) |
| SEGMENT 1 | 0 | 55M |
| SEGMENT 2 | 60M | 30M |
| SEGMENT 3 | 90M | 40M |
| UNASSIGNED SPACE | 130M | 20M |

FIG. 20

| SPORTS FILE | | | | |
|---|---|---|---|---|
| SEGMENT | START OFFSET ADDRESS (BYTE) | SEGMENT LENGTH (BYTE) | START TIME | END TIME |
| SEGMENT 1 | 0 | 20M | 99/06/23 10:23:02:22 | 99/06/23 10:24:12:07 |
| SEGMENT 2 | 20M | 50M | 99/06/23 10:27:05:13 | 99/06/23 10:31:14:19 |
| SEGMENT 3 | 70M | 40M | 99/08/27 13:48:07:15 | 99/08/27 13:52:10:20 |
| UNASSIGNED SPACE | 110M | 40M | | |

| QUIZ FILE | | | | |
|---|---|---|---|---|
| SEGMENT | START OFFSET ADDRESS (BYTE) | SEGMENT LENGTH (BYTE) | START TIME | END TIME |
| SEGMENT 1 | 0 | 40M | 99/03/15 09:42:23:05 | 99/03/15 09:46:28:12 |
| SEGMENT 2 | 60M | 30M | 99/08/31 11:01:14:27 | 99/08/31 11:04:02:12 |
| UNASSIGNED SPACE | 40M | 20M | | |
| UNASSIGNED SPACE | 90M | 60M | | |

FIG. 21

```
%ftp> ℓs-2ℓ
```

| | LENGTH | START TIME | | END TIME | |
|---|---|---|---|---|---|
| Sports | 150MB | 99/06/23 | 10:23:02:22 | 99/08/27 | 13:52:10:20 |
| Sports 1 | 20MB | 99/06/23 | 10:23:02:22 → | 99/06/23 | 10:24:12:07 |
| Sports 2 | 50MB | 99/06/23 | 10:27:05:13 → | 99/06/23 | 10:31:14:19 |
| Sports 3 | 40MB | 99/08/27 | 13:48:07:15 → | 99/08/27 | 13:52:10:20 |
| Quiz | 150MB | 99/03/15 | 09:42:23:05 → | 99/08/31 | 11:04:02:12 |
| Quiz 1 | 40MB | 99/03/15 | 09:42:23:05 → | 99/03/15 | 09:46:28:12 |
| Quiz 2 | 30MB | 99/08/31 | 11:01:14:27 → | 99/08/31 | 11:04:02:12 |

FIG. 22

| SEGMENT NAME<br>= FILE NAME OF A FILE TO WHICH A SEGMENT BELONGS<br>+ ALPHABET INDICATING A SERIAL STORAGE-ORDER<br>NUMBER OF SEGMENT IN FILE |
|---|

FIG. 23

| SPORTS FILE | | |
|---|---|---|
| SEGMENT NAME | START OFFSET ADDRESS (BYTE) | SEGMENT LENGTH (BYTE) |
| baseball | 0 | 20M |
| tennis | 20M | 50M |
| ski | 70M | 40M |
| UNASSIGNED SPACE | 110M | 40M |
| QUIZ FILE | | |
| SEGMENT NAME | START OFFSET ADDRESS (BYTE) | SEGMENT LENGTH (BYTE) |
| Introquiz | 0 | 60M |
| Jesturequiz | 60M | 30M |
| UNASSIGNED SPACE | 90M | 60M |

FIG. 24A

| SPORTS FILE | | |
|---|---|---|
| SEGMENT | START OFFSET ADDRESS (BYTE) | SEGMENT LENGTH (BYTE) |
| SEGMENT 1 | 0 | 20M |
| SEGMENT 2 | 20M | 50M |
| SEGMENT 3 | 70M | 40M |
| UNASSIGNED SPACE | 110M | 40M |
| QUIZ FILE | | |
| SEGMENT | START OFFSET ADDRESS (BYTE) | SEGMENT LENGTH (BYTE) |
| SEGMENT 1 | 0 | 60M |
| SEGMENT 2 | 60M | 30M |
| UNASSIGNED SPACE | 90M | 60M |

FIG. 24B

| SEGMENT NAME | FILE NAME | STORAGE ORDER |
|---|---|---|
| baseball | Sports | 1 |
| tennis | Sports | 2 |
| ski | Sports | 3 |
| Introquiz | Quiz | 1 |
| Jesturequiz | Quiz | 2 |

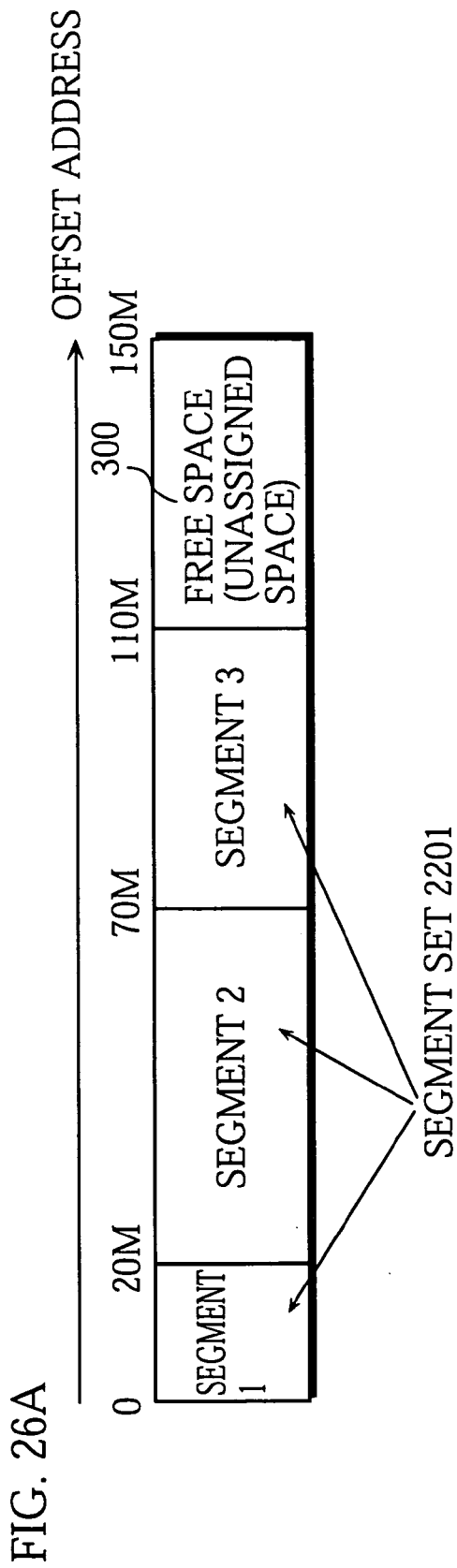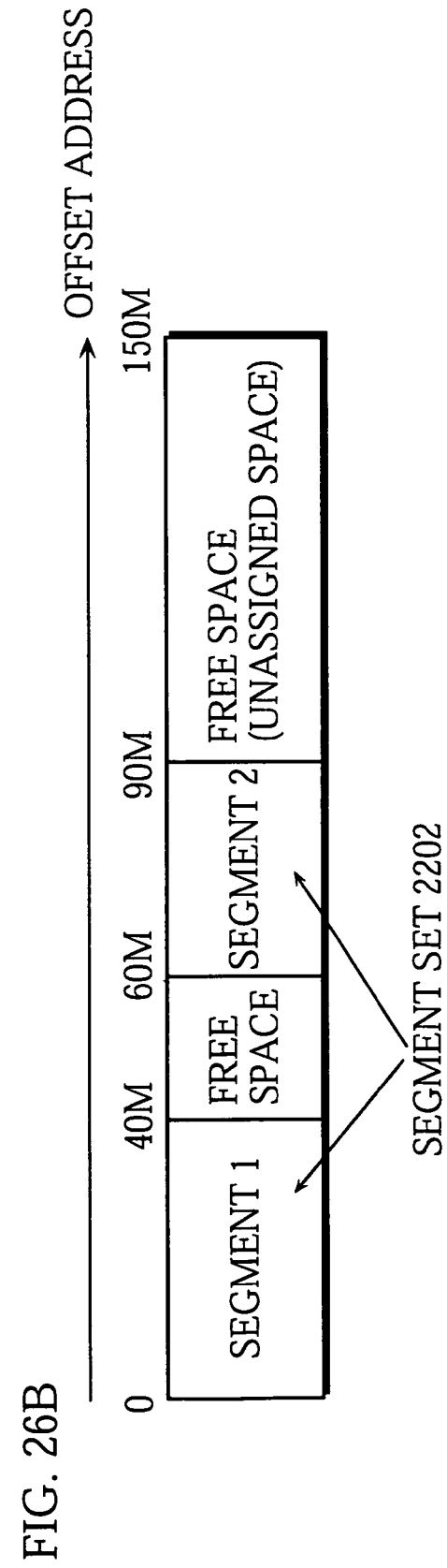
FIG. 26A
FIG. 26B

FIG. 32

| QUIZ FILE | | |
|---|---|---|
| SEGMENT | START OFFSET ADDRESS (BYTE) | SEGMENT LENGTH (BYTE) |
| SEGMENT 1 | 0 | 20M |
| SEGMENT 2 | 20M | 30M |
| SEGMENT 3 | 50M | 10M |
| UNASSIGNED SPACE | 60M | 90M |

FIG. 34

| QUIZ FILE | | |
|---|---|---|
| SEGMENT | START OFFSET ADDRESS (BYTE) | SEGMENT LENGTH (BYTE) |
| SEGMENT 1 | 0 | 40M |
| SEGMENT 2 | 40M | 20M |
| SEGMENT 3 | 60M | 30M |
| SEGMENT 4 | 90M | 30M |
| SEGMENT 5 | 120M | 20M |
| UNASSIGNED SPACE | 140M | 10M |

FILE MANAGEMENT APPARATUS AND METHOD

BACKGROUND OF THE INVENTION (1) Field of the Invention

The present invention relates to a file management apparatus. More particularly, the present invention relates to a file management apparatus and a file management method which are suitable for the case where each file is composed of logical units (segments).

(2) Description of Related Art

General-purpose operating systems have a file system (file management apparatus) for managing files, as one of the functions thereof. The file management apparatus uses names of files (file names) stored in a storage apparatus. The file names and storage positions of files are registered with a directory (catalog). When a user requests to read or write data from/into a file specifying a file name, the file management apparatus refers to the directory to detect a storage position of a file having the file name, and reads or writes the file from/into the storage apparatus. Suppose, for example, a user in an FTP system composed of FTP clients and an FTP server sends a request specifying a file name from an FTP client, then the FTP client sends a request command including the file name to the FTP server. The file management apparatus in the FTP server refers to the directory to detect a storage position of a file having the file name reads the file from the storage apparatus, and sends the read file to the FTP client.

In the above-described system, the user need not be conscious of the storage position of the file, but just specify the file name to access the file.

Meanwhile, some files include logical units (segments). For example, a file may include different pieces of video data which are recorded at different times. In this case, some portions in the file are consecutive in the time domain and other portions are not. That is to say, a logical unit is formed based on the time-domain continuity of the portions in a file. More specifically, a sequence of portions that are consecutive in the time domain form a segment, and a gap between non-consecutive portions is regarded as a gap between segments.

A user may want to transfer or reproduce one specific segment among a plurality of segments contained in a file, as well as the whole file. To achieve this, the user has to find gaps between segments one by one as he/she produces the file after reading it from a storage apparatus, write down the addresses of the gaps, and input a written-down address to the file management apparatus to access a desired segment. The file management apparatus accesses the segment using the address input from the user. However, this operation is very complicated and it becomes a heavy burden to the user.

SUMMARY OF THE INVENTION

It is therefore an object of the present invention to provide a file management apparatus and a file management method which can access data in units of segments constituting files, as well as in units of files, and allow users to easily specify desired segments.

The above object is fulfilled by a file management apparatus which stores and manages file storage positions in a one-to-one correspondence with file names and accesses files that correspond to specified file names, the file management apparatus comprising: a file storage unit operable to store files which each include a plurality of numbered pieces of data; a position information storage unit operable to store pieces of position information that indicate segment storage positions in the file storage unit, the pieces of position information being in a one-to-one correspondence with segment names, and each segment being a set of pieces of data having consecutive numbers; an access request receiving unit operable to receive a segment access request specifying a segment name; a position information read unit operable to read, from the position information storage unit, a piece of position information corresponding to the segment name specified in the segment access request; and a segment access unit operable to access a segment in the file storage unit by referring to the read piece of position information.

With the above construction, when a file includes one or more segments which are sets of pieces of data having consecutive numbers, not only the whole file but the segments can be accessed. That is, data in files can be accessed in units of segments, and the segments can be accessed by a simple method of specifying the segment names in much the same way as a conventional method of accessing files by specifying file names.

The above object is fulfilled by a file management apparatus which stores and manages file storage positions in a one-to-one correspondence with file names and accesses files that correspond to specified file names, the file management apparatus comprising: a file storage unit operable to store files which each include a plurality of pieces of data that have each been assigned a timecode; a position information storage unit operable to store pieces of position information that indicate segment storage positions in the file storage unit, the pieces of position information being in a one-to-one correspondence with segment names, each segment being a set of pieces of data having consecutive timecodes; an access request receiving unit operable to receive a segment access request specifying a segment name; a position information read unit operable to read, from the position information storage unit, a piece of position information corresponding to the segment name specified in the segment access request; and a segment access unit operable to access a segment in the file storage unit by referring to the read piece of position information.

With the above construction, when a file includes one or more segments which are sets of pieces of data having consecutive timecodes, not only the whole file but the segments can be accessed. That is, data in files can be accessed in units of segments, and the segments can be accessed by a simple method of specifying the segment names in much the same way as a conventional method of accessing files by specifying file names.

In the above file management apparatus, each piece of segment position information may include (1) an address indicating a file start storage position of a file to which the segment belongs, and either (2-1) (a) an address offset indicating a size of a portion between the file start and a start of the segment and (b) an address offset indicating a size of a portion between the file start and an end of the segment, or (2—2) (a) an address offset indicating a size of a portion between the file start and a start of the segment and (c) a size of the segment.

With the above construction, each piece of segment position information stored in the segment information storage unit is represented by (1) the start address of the file to which the segment belongs and (2) an address offset (relative address) of the segment. Accordingly, the segment positions can be indicated by recording address offsets in addition to the file start address which is held also by conventional file management apparatuses. With this method, only the file start is represented by an absolute address with a lot of bits, and segment positions are represented by relative addresses with a small number of bits, resulting in use of less number of bits than the case of representing the segment positions by absolute addresses.

In the above file management apparatus, the position information storage unit may store the pieces of position information in the same order as the segments for each file, and the file management apparatus further comprising: a receiving unit operable to receive a segment name obtainment request; and a segment name output unit operable to, after the receiving unit receives the segment name obtainment request, refer to the position information storage unit and output to outside the file management apparatus a list of segment names which each include at least (1) a file name of a file to which the segment belongs and (2) a character sequence which indicates a position of the segment in one or more segments belonging to the file.

With the above construction, each segment name includes (1) a file name of a file to which the segment belongs and (2) a character sequence which indicates a position of the segment in one or more segments belonging to the file. This provides users with segment names which are unique and easy to recognize.

In the above file management apparatus, the position information storage unit may store a table showing relationships between (1) file names of files to which the segments belong, (2) serial numbers of the segments in the files which are assigned in order of storage in the files, and (3) pieces of position information, and the position information read unit after receiving a segment name, refers to the table to detect a piece of position information that corresponds to a file name and a serial number of the segment which are included in the segment name, and reads the detected piece of position information from the table.

With the above construction, the position information read unit can detect, by referring to a segment name, (1) the unique file to which the access target segment belongs and (2) the unique position of the access target segment among the segments in the file.

The above object is also fulfilled by a file management apparatus which stores and manages file storage positions in a one-to-one correspondence with file names and accesses files that correspond to specified file names, the file management apparatus comprising: a file storage unit operable to store files which each include a plurality of pieces of data that have each been assigned a timecode; a first position information storage unit operable to store pieces of position information that indicate file storage positions in the file storage unit, the pieces of position information being in a one-to-one correspondence with file names; a second position information storage unit operable to store pieces of position information that indicate segment storage positions in the file storage unit, the pieces of position information being in a one-to-one correspondence with segment names, and each segment being a set of pieces of data having constructive timecodes; an access request receiving unit operable to receive an access request specifying an access target name which is either a segment name or a file name; a judgement unit operable to judge whether the access target name is a segment name or a file name; a position information read unit operable to read, from either the first position information storage unit or the second position information storage unit, a piece of position information corresponding to the access target name judged by the judgement unit; and an access unit operable to access either a segment or a file stored in the file storage unit by referring to the read piece of position information.

With the above construction, the judgement unit judges whether the access target name is a segment name or a file name, and based on this judgement, the position information read unit reads a piece of file position information or a piece of segment position information. Accordingly, when a file includes one or more segments, both the file and the segments can be accessed with the same method. This reduces the load on the user.

In the above file management apparatus, the judgement unit may judge that the access target name is a segment name when the access target name includes a name of a file stored in the file storage unit and a character sequence indicating a serial number of a segment in the file.

With the above construction, the judgement unit judges that the access target name is a segment name when the access target name includes a name of a file stored in the file; storage unit and a character sequence indicating a serial number of a segment in the file, such as a number (1, 2, . . . ) or a capital letter (A, B, . . . ). It is therefore possible to judge immediately from the access target name whether the request is a segment access request or a file access request, without referring to file names stored in the file information storage unit, for example.

The above object is also fulfilled by a file management apparatus which stores and manages file storage positions in a one-to-one correspondence with file names and accesses files that correspond to specified file names, the file management apparatus comprising: a file obtaining unit operable to obtain files which each include a plurality of pieces of video data that have each been assigned a timecode, and store the obtained files in a file storage unit; the file storage unit operable to store the obtained files; a position information obtaining unit operable to recognize each set of pieces of data having consecutive timecodes as a segment, obtain pieces of position information that indicate segment storage positions in the file storage unit, and store the obtained pieces of position information in a position information storage unit; the position information storage unit operable to store the obtained pieces of position information; a segment access request receiving unit operable to receive a segment access request specifying a segment; a position information read unit operable to read, from the position information storage unit, a piece of position information corresponding to the segment specified in the segment access request; and a segment access unit operable to access the segment in the file storage unit by referring to the read piece of position information.

With the above construction, when a file includes different pieces of video data recorded at different times, the video data can be accessed in units of segments which are each composed of video data having consecutive timecodes. It is therefore possible, for example, to play a piece of video data recorded at a specific time, among the segments in the file.

The above object is also fulfilled by a file management apparatus which stores and manages file storage positions in a one-to-one correspondence with file names and accesses files that correspond to specified file names, the file management apparatus comprising: a file obtaining unit operable to obtain files which each include a plurality of pieces of video data that have each been assigned a timecode, and store the obtained files in a file storage unit; the file storage unit operable to store the obtained files; a segment identifying unit operable to recognize each set of pieces of video data having consecutive timecodes as a segment; a position information creating unit operable to create pieces of position information that indicate storage positions of the identified segments in the file storage unit, and store the created pieces of position information in a position information storage unit; the position information storage unit operable to store the created pieces of position information; a segment access request receiving unit operable to receive a segment access request specifying a segment; a position information read unit operable to read, from the position information storage unit, a piece of position information corresponding to the segment specified in the segment access request; and a segment access unit operable to access the segment in the file storage unit by referring to the read piece of position information.

With the above construction, it is possible for the apparatus to identify each segment in a file by referring to the timecode assigned to the video data. With this arrangement, the user need not specify a desired segment in the file.

The above object is also fulfilled by a file management apparatus which stores and manages file storage positions in a one-to-one correspondence with file names and accesses files that correspond to specified file names, the file management apparatus comprising: a file storage unit operable to store files which each include one or more segments that are each a logical unit; a position information storage unit operable to store pieces of position information that indicate segment storage positions in the file storage unit; an access request receiving unit operable to receive a segment set access request specifying a segment set name, each segment set being composed of all segments in a file, and each segment set name including a name of the file and a character sequence unique to segment set names; a position information read unit operable to identify a file to which a segment set corresponding to the specified segment set name belongs, and read, from the position information storage unit, pieces of position information corresponding to all segments belonging to the identified file, recognizing the read pieces of position information as a piece of position information of the segment set; and a segment set access unit operable to access the segment set in the file storage unit by referring to the piece of position information of the segment set.

With the above construction, when a file includes one or more segments which are logical units, not only the whole file but the segments can be accessed. That is, data in files can be accessed in units of segments, and the segments can be accessed by a simple method of specifying the segment names in much the same way as a conventional method of accessing files by specifying file names. This has an effect especially in the case where the file includes a free space in which no segment is stored. That is, in conventional file access methods, it is impossible to access only segments excluding the other portions in a file. In contrast, in the present method of accessing segment sets, it is possible to extract and access only the segment portion in the file.

In the above file management apparatus, each piece of segment position information includes (1) an address indicating a file start storage position of a file to which the segment belongs, and either (2-1) (a) an address offset indicating a size of a portion between the file start and a start of the segment and (b) an address offset indicating a size of a portion between the file start and an end of the segment, or (2—2) (a) an address offset indicating a size of a portion between the file start and a start of the segment and (c) a size of the segment.

With the above construction, each piece of segment position information stored in the segment information storage unit is represented by (1) the start address of the file to which the segment belongs and (2) an address offset (relative address) of the segment. Accordingly, the segment positions can be indicated by recording address offsets in addition to the file start address which is held also by conventional file management apparatuses. With this method, only the file start is represented by an absolute address with a lot of bits, and segment positions are represented by relative addresses with a small number of bits, resulting in use of less number of bits than the case of representing the segment positions by absolute addresses.

The above file management apparatus may further comprise: a receiving unit operable to receive a segment set name obtainment request; and a segment set name output unit operable to, after the receiving unit receives the segment set name obtainment request, refer to the position information storage unit and output to outside the file management apparatus a list of segment set names which each include (1) a file name of a file to which the segment set belongs and (2) a character sequence unique to segment set names.

With the above construction, each segment name-includes (1) a file name of a file to which the segment belongs and (2) a character sequence which is unique to segment set names. This provides users with segment set names which are unique and easy to recognize.

In the above file management apparatus, each file may include a plurality of pieces of video data that have each been assigned a timecode, and the file management apparatus further comprises: a segment identifying unit operable to recognize each set of pieces of video data having consecutive timecodes as a segment; and a position information creating unit operable to create pieces of position information that indicate storage positions of the identified segments in the file storage unit, and store the created pieces of position information in the position information storage unit.

With the above construction, when a file includes different pieces of video data recorded at different times, and the user wants to play only a piece of video data recorded at a specific time, the specific piece of video data can be identified by referring to its timecode. With this arrangement, the user need not specify a desired piece of video data in the file.

The above object is also fulfilled by a file management apparatus which stores and manages file storage positions in a one-to-one correspondence with file names and accesses files that correspond to specified file names, the file management apparatus comprising: a file storage unit operable to store files which each include one or more segments that are each a logical unit; a first position information storage unit operable to store pieces of position information that indicate file storage positions in the file storage unit, the pieces of position information being in a one-to-one correspondence with file names; a second position information storage unit operable to store pieces of position information that indicate segment storage positions in the file storage unit; an access request receiving unit operable to receive an access request specifying an access target name; a judgement unit operable to judge whether the access target name is a segment set name or a file name, each segment set being a set of all segments included in one file; a position information read unit operable to read, from either the first position information storage unit or the second position information storage unit, a piece of position information corresponding to the access target name judged by the judgement unit; and an access unit operable to access either a segment set or a file stored in the file storage unit by referring to the read piece of position information.

With the above construction, the judgement unit judges whether the access target name is a segment set name or a file name, and based on this judgement, the position information read unit reads a piece of file position information or a piece of segment set position information. Accordingly, when a file includes one or more segments, both the file and the segment sets can be accessed with the same method of specifying an access target name. This reduces the load on the user.

In the above file management apparatus, the judgement unit may judge that the access target name is a segment set name when the access target name includes a name of a file stored in the file storage unit and a character sequence unique to segment set names.

With the above construction, the judgement unit judges that the access target name is a segment set name when the access target name includes a name of a file stored in the file storage unit and a character sequence unique to segment set names. It is therefore possible to judge immediately from the access target name whether the request is a segment set access request or a file access request, without referring to file names stored in the file information storage unit, for example.

The above object is also fulfilled by a file management apparatus which stores and manages file storage positions in a one-to-one correspondence with file names and accesses files that correspond to specified file names, the file management apparatus comprising: a file storage unit operable to store files which each include a plurality of pieces of data that have each been assigned a timecode; a position information storage unit operable to store pieces of position information that indicate positions of free spaces in the files, each free space not storing a segment, and each segment being a set of pieces of data having consecutive timecodes; an add request receiving unit operable to receive a segment add request which requests to add a new segment to a file; a segment obtaining unit operable to obtain a new segment; a position information read unit operable to read, from the position information storage unit, a piece of free space position information; and a segment add unit operable to add the new segment to the file storage unit by referring to the read piece of free space position information.

With the above construction, a new segment is written onto a portion (free space) excluding segments in a file when the new segment is added to the file. Accordingly, a new segment can be added to a file maintaining existent segments in the file.

The above object is also fulfilled by a file management apparatus which stores and manages file storage positions in a one-to-one correspondence with file names and accesses files that correspond to specified file names, the file management apparatus comprising: a file storage unit operable to store files which each include a plurality of pieces of data that have each been assigned a timecode; a position information storage unit operable to store pieces of free space position information that indicate positions of free spaces in the files, each free space not storing a segment, and also store pieces of segment position information that indicate positions of segments in the files, each segment being a set of pieces of data having consecutive timecodes; an add request receiving unit operable to receive a segment set add request specifying (1) an add destination file and (2) a source file including a segment set which is to be added to the add destination file; a position information read unit operable to read, from the position information storage unit, a piece of free space position information indicating a position of a free space of the specified add destination file; a segment set extract unit operable to extract all segments included in the source file as a segment set by referring to the pieces of segment position information stored in the position information storage unit; and a segment set add unit operable to add the extracted segment set to the free space by referring to the read piece of free space position information.

With the above construction, a segment set included in a source file is written onto a portion (free space) excluding segments in an add destination file when the segment set is added to the add destination file. Accordingly, a new segment set can be added to a file maintaining existent segments in the file.

The above object is also fulfilled by a file management apparatus which stores and manages file storage positions in a one-to-one correspondence with file names and accesses files that correspond to specified file names, the file management apparatus comprising: a file storage unit operable to store files which each include a plurality of pieces of data that have each been assigned a timecode; a position information storage unit operable to store pieces of free space position information that indicate positions of free spaces in the files, each segment being a set of pieces of data having consecutive timecodes; an add request receiving unit operable to receive a file add request specifying (1) an add destination file and (2) a source file which is to be added to the add destination file; a position information read unit operable to read, from the position information storage unit, a piece of free space position information indicating a position of a free space of the specified add destination file; a file add unit operable to add the source file to the free space by referring to the read piece of free space position information.

With the above construction, a source file including segments is written onto a portion (free space) excluding segments in an add destination file when the source file is added to the add destination file. Accordingly, a new file including segments can be added to another file maintaining existent segments in the other file.

The above object is also fulfilled by a file management apparatus which stores and manages file storage positions in a one-to-one correspondence with file names and accesses files that correspond to specified file names, the file management apparatus comprising: a file storage unit operable to store files which each include one or more segments that are each a logical unit; a position information storage unit operable to store pieces of position information that indicate segment storage positions in the file storage unit; an access request receiving unit operable to receive a segment partial set access request specifying a file name and a condition, each segment partial set being a set of one or more segments in one file; a position information read unit operable to read, from the position information storage unit, pieces of position information corresponding to all segments belonging to the specified file and satisfying the specified condition, recognizing the read pieces of position information as a piece of position information of the requested segment partial set; and a segment partial set access unit operable to access the segment partial set by referring to the piece of position information of the segment partial set.

With the above construction, not only the whole file but segment partial sets can be accessed, where each segment partial set is a set of segments which belong to a specified file and satisfy a specified condition. With this arrangement, when a file includes a segment portion and other portions, only the segments that satisfy a desired condition can be extracted, copied, or transferred.

In the above file management apparatus, each file may include video data including portions that have each been assigned a timecode, and the file management apparatus further comprises: a segment identifying unit operable to recognize each set of video data portions having consecutive timecodes as a segment; and a position information creating unit operable to create pieces of position information that indicate storage positions of the identified segments in the file storage unit, and store the created pieces of position information in the position information storage unit.

With the above construction, each piece of video data can be identified by referring to its timecode. With this arrangement, the user need not specify a desired piece of video data in a file.

The above object is also fulfilled by a file management method or a computer-readable record medium recording a file management program.

As described above, the present invention is free from a limitation that data should be accessed in units of files as logical units. This provides a great practical effect since it provides more flexible data management.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows simplified contents of the file information;

FIG. 5 shows the segment information used to detect the position of each segment shown in FIG. 3;

FIG. 6 shows a rule for generating segment names;

FIG. 7 shows examples of generated segment names;

FIG. 9 shows a screen displayed on the display unit 605 of the FTP client 600;

FIG. 10 shows a screen displayed on the display unit 605 of the FTP client 600;

FIG. 17 shows the segment information of the "Quiz" file;

FIG. 19 shows the segment information of the "Quiz" file;

FIG. 20 shows an example of detailed segment information;

FIG. 21 shows an example where, based on the detailed segment information shown in FIG. 20, a name and detailed information are displayed for each segment and each file;

FIG. 22 shows another example of the rule for generating segment names;

FIG. 23 shows an example of the segment information in the case where segment names are stored in the segment information storage unit 103;

FIG. 24A shows the first table stored in the segment information storage unit 103;

FIG. 24B shows the second table stored in the segment information storage unit 103;

FIGS. 26A and 26B show examples of segment sets arranged in files;

FIG. 32 shows the segment information of the "Quiz" file after an update;

FIG. 34 shows the updated segment information of the "Quiz" file;

DESCRIPTION OF THE PREFERRED EMBODIMENTS

Figure 1:
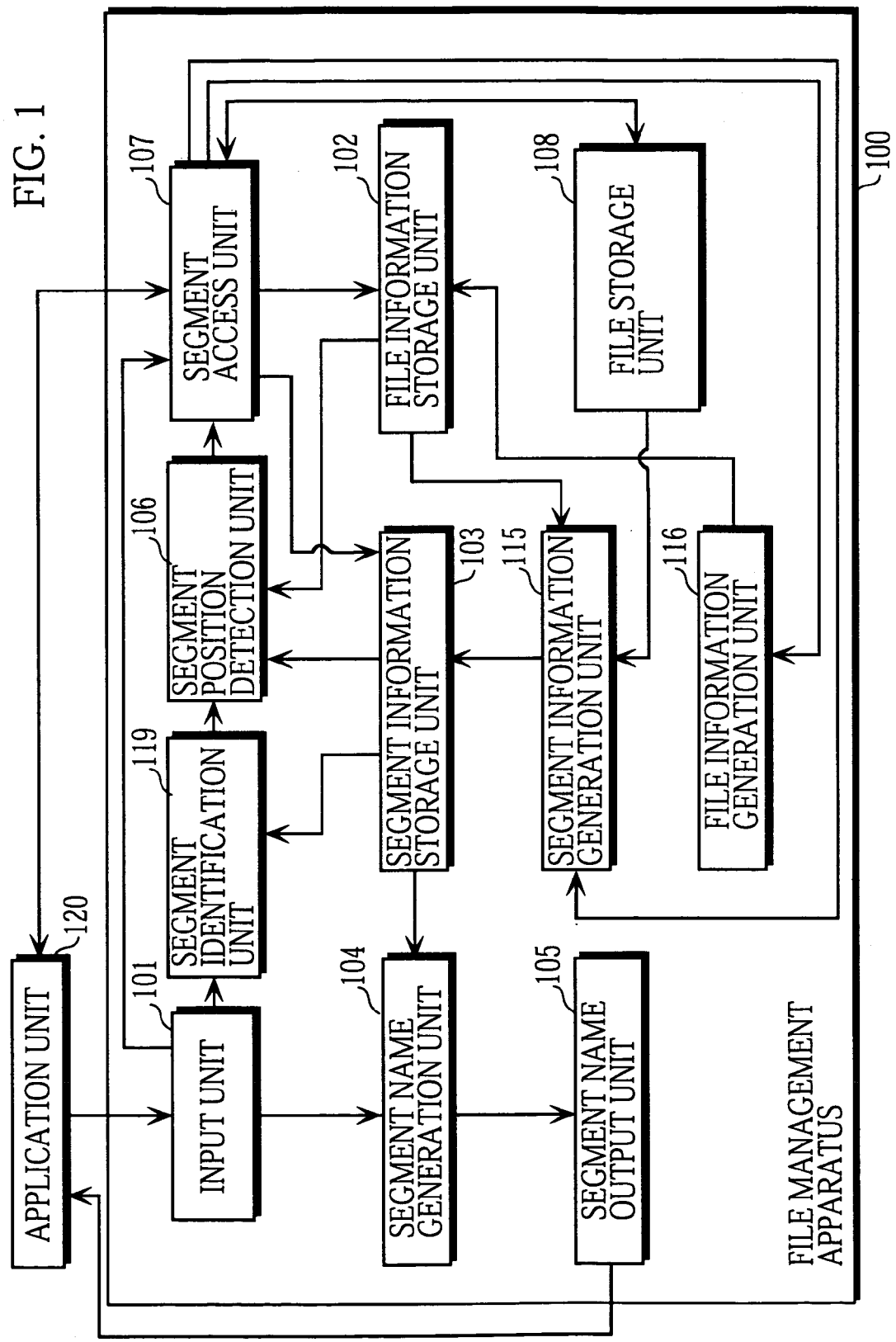
FIG. 1 is a functional block diagram showing the construction of the file management apparatus in Embodiment 1.

The following are description of the present invention through specific embodiments thereof by way of referring to the drawings.

Embodiment 1

Embodiment 1 relates to a file management apparatus which specifies a logical unit (segment) constituting a file, reads, overwrites, or adds data in units of segments, and specifies a segment by the segment name thereof.

<Construction>

FIG. 1 is a functional block diagram showing the construction of the file management apparatus in the present embodiment. As shown in FIG. 1, the file management apparatus 100 in the present embodiment includes an input unit 101, a file information storage unit 102, a segment information storage unit 103, a segment name generation unit 104, a segment name output unit 105, a segment identification unit 119, a segment position detection unit 106, a segment access unit 107, and a file storage unit 108. Upon receipt of, from an application unit 120, a request to obtain a segment name, the file management apparatus 100 obtains the segment name and sends the obtained segment name to the application unit 120. Also, upon receipt of, from the application unit 120, a request to access (read or write) segment data with a segment name, the file management apparatus 100 reads or writes the segment data.

FIG. 1 shows the components of the file management apparatus 100 based on the functions thereof. In reality, however, the file management apparatus 100 is composed of hardware including a CPU, a memory, and a hard disk, and an Operating System (OS) executed on the hardware. More specifically, the input unit 101, segment identification unit 119, segment position detection unit 106, segment access unit 107, segment name generation unit 104, segment name output unit 105, a segment information generation unit 115, and a file information generation unit 116 represent functions of the OS executed on the hardware, and the file information storage unit 102, segment information storage unit 103, and file storage unit 108 represent a part of a storage area in the hard disk.

The application unit 120 reads or writes data in units of segments using the file management apparatus 100. The application unit 120 sends a request to obtain a segment name to the file management apparatus 100, and receives a segment name from the file management apparatus 100. The application unit 120 also sends a request to read segment data specifying a segment name to the file management apparatus 100, and receives the requested segment data from the file management apparatus 100. The application unit 120 also sends a request to write segment data specifying a segment name to the file management apparatus 100, and outputs the requested segment data to the file management apparatus 100.

The application unit 120 sends a segment access request to the file management apparatus of the present embodiment by specifying a segment name in much the same way as conventional applications access a file using a file name. As a result, by merely adding an extended function (a function for outputting an instruction to detect a segment which will be described later) to a conventional application for accessing conventional files, the conventional application can be used as the application unit 120 for using the file management apparatus of the present embodiment.

The input unit 101 receives, from the application unit 120, a request to obtain a segment name and a request to read or write segment data specifying a segment name.

Figure 2:
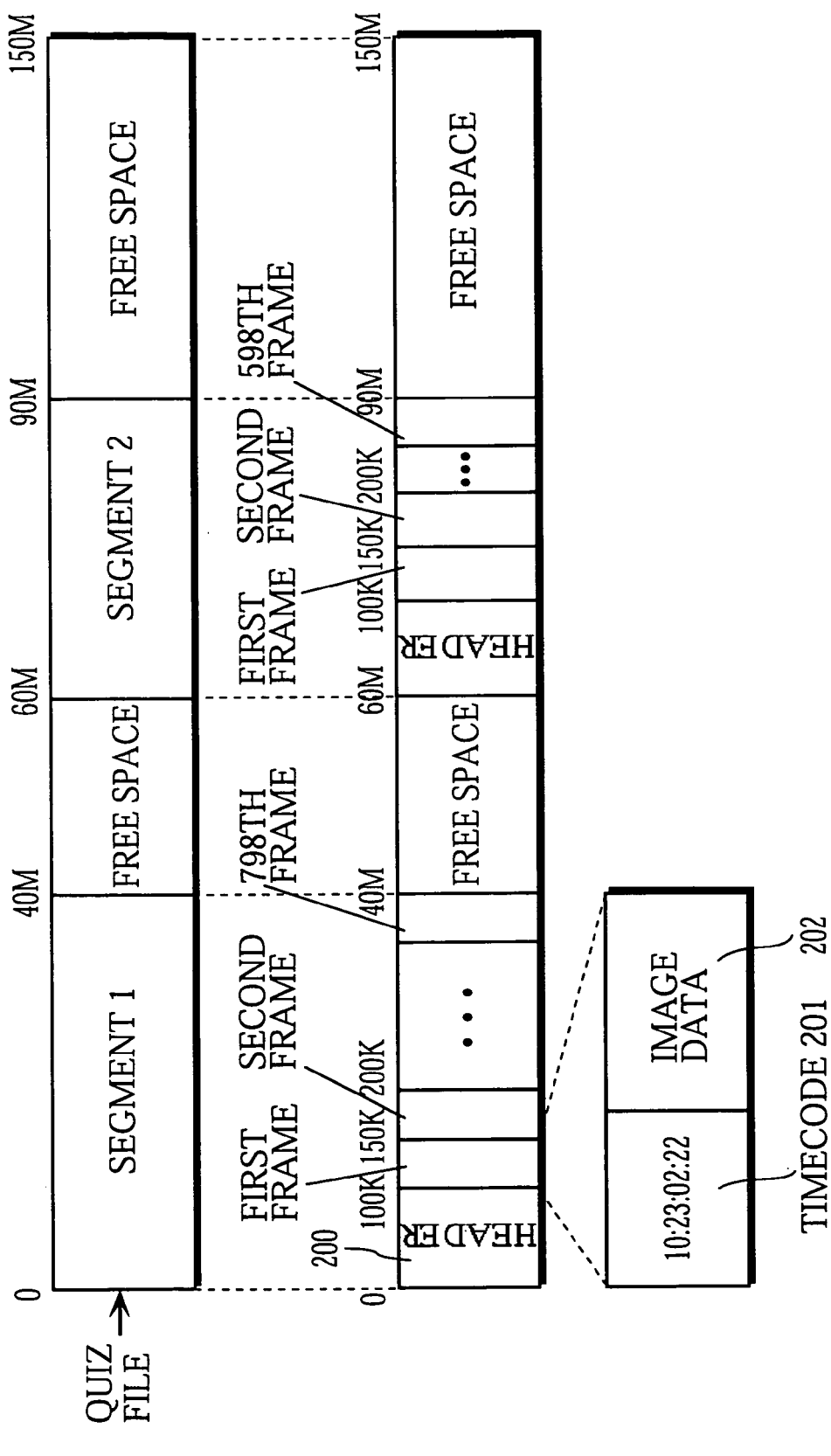
FIG. 2 is a simplified figure showing the structure of a file including segments which are sequences of portions having consecutive timecodes.

The file storage unit 108 stores file data. Each file includes one or more segments. Here, "segment" indicates a group of consecutive areas which have a logical meaning as one unit in the file. In the case of a file storing moving-image data, for example, a sequence of portions in the file having consecutive timecodes are recognized as a segment. FIG. 2 is a simplified figure showing the structure of a file including segments, or sequences of portions having consecutive timecodes. As shown in FIG. 2, each segment is composed of a header and a plurality of frames, and has one timecode. The timecodes included in one segment are consecutive. Here, each header includes information indicating a format of the moving-image data, an image size, etc. Each frame includes a timecode 201 and image data 202. It is supposed that 30 frames of moving-image data are reproduced per second, and that the timecode 201 represents the time in a format of "hour (0–23): minute (0–59): second (0–59): frame number (0–29)". Here, a sequence of two non-consecutive frame numbers indicates that the gap between the two frames is a gap between two segments.

Figure 3A:
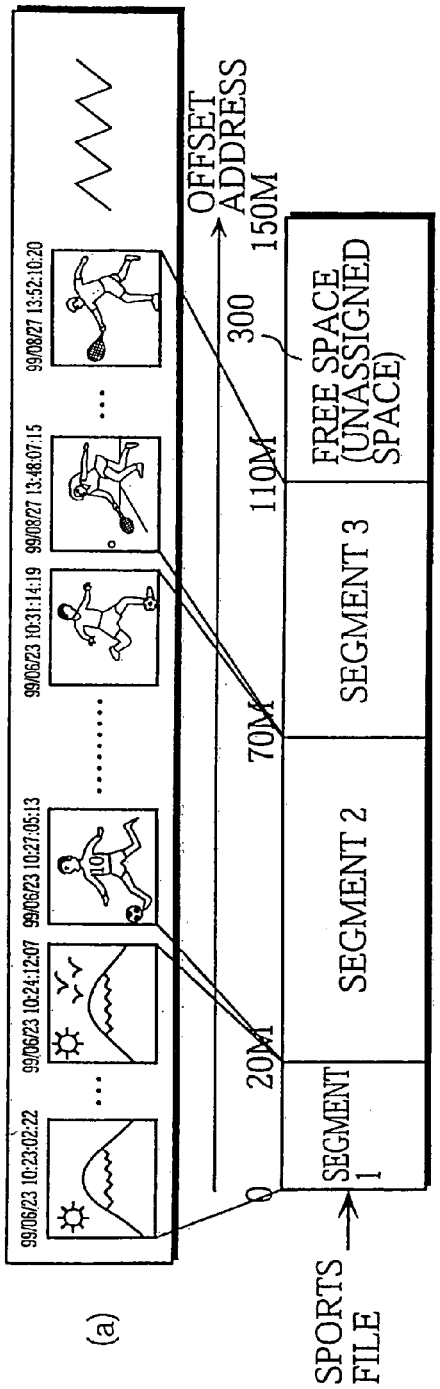
FIGS. 3A and 3B show examples of segments arranged in files.
Figure 3B:
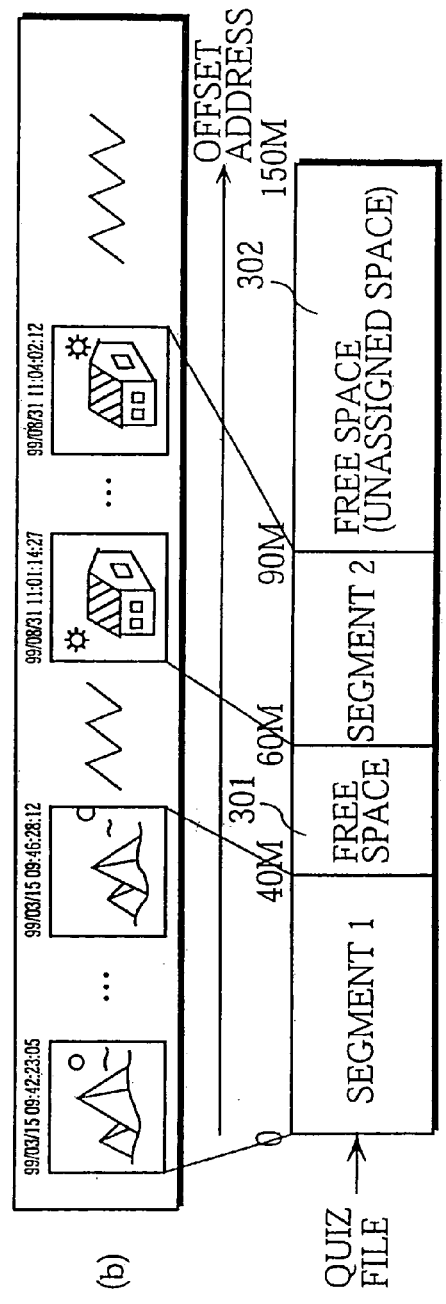

FIGS. 3A and 3B show examples of segments arranged in files. Each file has a fixed size of 150 MB, and one or more segments are written in arbitrary positions in a file. As shown in FIG. 3A, the "Sports" file includes three segments. Also, as shown in FIG. 3B, the "Quiz" file includes two segments. Here, free spaces 300 to 302 are "portions other than segments", that is to say, "portions which do not form a logical unit". "Unassigned spaces" (300 and 302) among the free spaces (300 to 302) are spaces located at the end of files. A segment may be newly created in these unassigned spaces.

In the "Sports" file shown in FIG. 3A, the boundary between the segment 1 and segment 2 is recognized to be between non-consecutive timecodes (10:24:12:07 and 10:27:05:13), and the boundary between the segment 2 and segment 3 between non-consecutive timecodes (10:31:14:19 and 13:48:07:15). In the "Quiz" file shown in FIG. 3B, the end of the segment 1 is adjacent to a free space having no timecode, and the start and the end of the segment 2 are adjacent to free spaces.

The file information storage unit 102 stores directory information which is information of files stored in the file storage unit 108. FIG. 4 shows simplified contents of the file information. As shown in FIG. 4, the file information at least includes, for each file stored in the file storage unit 108, a file name, a storage position in the storage apparatus, and a creation date. Although in reality, the file information (directory information) includes other information, the details are omitted here.

The file information generation unit 116 updates the creation date in the file information after receiving notification from the segment access unit 107 that writing a piece of segment data has completed.

The segment information storage unit 103 stores segment information for each segment. Each piece of segment information is composed of (1) a file name of a file to which the segment belongs, and (2) position information which shows a relative position of the segment in the file. Each piece of position information is composed of (1) a start address offset which is a length between the start of the file and the start of the segment, and (2) a segment length. FIG. 5 shows the segment information used to detect the position of each segment shown in FIG. 3. In FIG. 5, a piece of segment information of a segment (segment 1) nearest to the start of the "Sports" file is composed of the file name (Sports), start address offset (0), and segment length (29 M).

The segment information generation unit 115, after a file is newly created, detects segments in the file, creates segment information composed of the file name, start address offset, and segment length for each detected segment, and stores the created segment information in the segment information storage unit 103. For example, in the case of a file storing moving-image data, sequences of portions having consecutive timecodes are recognized as segments. With this construction, even if a user has recorded a plurality of pieces of segment data into a file, not recognizing them as segment data but as file data, the file management apparatus by itself detects gaps between segments in the file, creates segment information, and stores the created segment information into the segment information storage unit 103.

The segment information generation unit 115, after receiving notification from the segment access unit 107 that writing a piece of segment data has completed, and receiving the start address offset and segment length of the piece of segment data, updates the segment information stored in the segment information storage unit 103. This enables the segment data stored in the segment information storage unit 103 to be updated even if a user writes segment data into a file without recognizing it as segment data.

The segment name generation unit 104 generates segment names for the segments currently stored in the segment information storage unit 103. FIG. 6 shows a rule for generating segment names. According to the rule, each segment name the segment name generation unit 104 generates must be composed of (1) a file name of a file to which the segment belongs, and (2) a serial number of the segment in the file which is assigned in order of storage in the file. FIG. 7 shows examples of segment names. As shown in FIG. 7, starting from the first segment in the file in order, the segments of the "Sports" file are assigned segment names "Sports1", "Sports2", and "Sports3'. Similarly, the segments of the "Quiz" file are assigned segment names "Quiz1" and "Quiz2" in order. It should be noted here that a numeral is not used as the last character of the file name to avoid confusion between a file name and a segment name.

The segment name output unit 105 outputs a segment name generated by the segment name generation unit 104 to the application unit 120.

The segment identification unit 119 identifies segments by analyzing, using the rule shown in FIG. 6, segment names sent from the input unit 101. More specifically, the segment identification unit 119 decomposes each segment name into a file name and a segment serial number, and sends the file name and the segment serial number to the segment position detection unit 106.

Also, in the case of writing segment data, to judge whether it is overwriting or addition, the segment identification unit 119 refers to the segment information stored in the segment information storage unit 103 to check if the specified segment has already been stored in it, and sends the check result to the segment position detection unit 106. For example, if a write instruction specifying "Sports2" as the segment name is received when segments 1 to 3 are actually stored in the Sports" file, the segment identification unit 119 sends a check result that the specified segment has already been stored. Also, if a write instruction specifying "Sports10" as the segment name is received in the same conditions, the segment identification unit 119 sends a check result that the specified segment is not stored. This is because although the "Sports" file is stored, the $10^{th}$ segment is not stored.

When the segment identification unit 119 receives a segment access request specifying a segment and cannot find the file that should include the specified segment, the segment identification unit 119 rejects the access request since it cannot write the specified segment.

The segment position detection unit 106 refers to the file information storage unit 102 and the segment storage unit 103 to identify a position where a segment is to be read, overwritten, or added. More specifically, the segment position detection unit 106 first reads, from the file information storage unit 102, the starting storage position of a file corresponding to a file name.

In the case of reading segment data, the segment position detection unit 106 then reads, from the segment information storage unit 103, the start address offset and the segment length of the segment identified by the segment serial number, detects the start storage position (absolute address) and the end storage position (absolute address) of the segment using the read start address offset and segment length and the start storage position of the file, and recognizes the range between the start storage position and the end storage position as the segment reading position.

In the case of writing segment data, when receiving notification from the segment identification unit 119 that the specified segment has already been stored in the storage unit, the segment position detection unit 106 detects the position where the segment should be overwritten. More specifically, the segment position detection unit 106 then reads, from the segment information storage unit 103, the start address offset of the segment and the start address offset of the next segment (this is not read if it is not stored), detects the start storage position (absolute address) of the segment and a storage position (absolute address) immediately before the start storage position of the next segment (in case the next segment is not stored, the end storage position of the segment), and recognizes the range between the start storage position of the segment and the storage position immediately before the start storage position of the next segment (in case the next segment is not stored, the end storage position of the segment) as the segment overwriting position.

In the case of writing segment data, when receiving notification from the segment identification unit 119 that the specified segment is not stored in the storage unit, the segment position detection unit 106 reads, from the segment information storage unit 103, the start address offset and the segment length of the unassigned space in the file, detects the start storage position (absolute address) and the end storage position (absolute address) of the unassigned space using the read start address offset and segment length and the start storage position of the file, and recognizes the range between the start storage position and the end storage position of the unassigned space as the segment adding position.

The segment access unit 107 executes reading, overwriting, or adding of segment data as follows at the reading, writing, or adding position detected by the segment position detection unit 106.

In the case of reading segment data, the segment access unit 107 reads the specified segment from the reading position in the file storage unit 108, and outputs the read segment to the application unit 120.

In the case of overwriting segment data, the segment access unit 107 overwrites the segment data sent from the application unit 120 onto the overwriting position for the specified segment in the file storage unit 108. It is also possible to write segment data into a free space between segments.

In the case of adding segment data, the segment access unit 107 writes the segment data sent from the application unit 120 onto the adding position for the specified segment in the file storage unit 108 as additional data.

The segment access unit 107, upon receipt of an instruction from the application unit 120 via the input unit 101 to end writing, ends writing the segment data, notifies the segment information generation unit 115 and the file information generation unit 116 that the writing has completed, and sends the start address offset and segment length of the written segment to the segment information generation unit 115.

APPLICATION EXAMPLE 1

Figure 8:
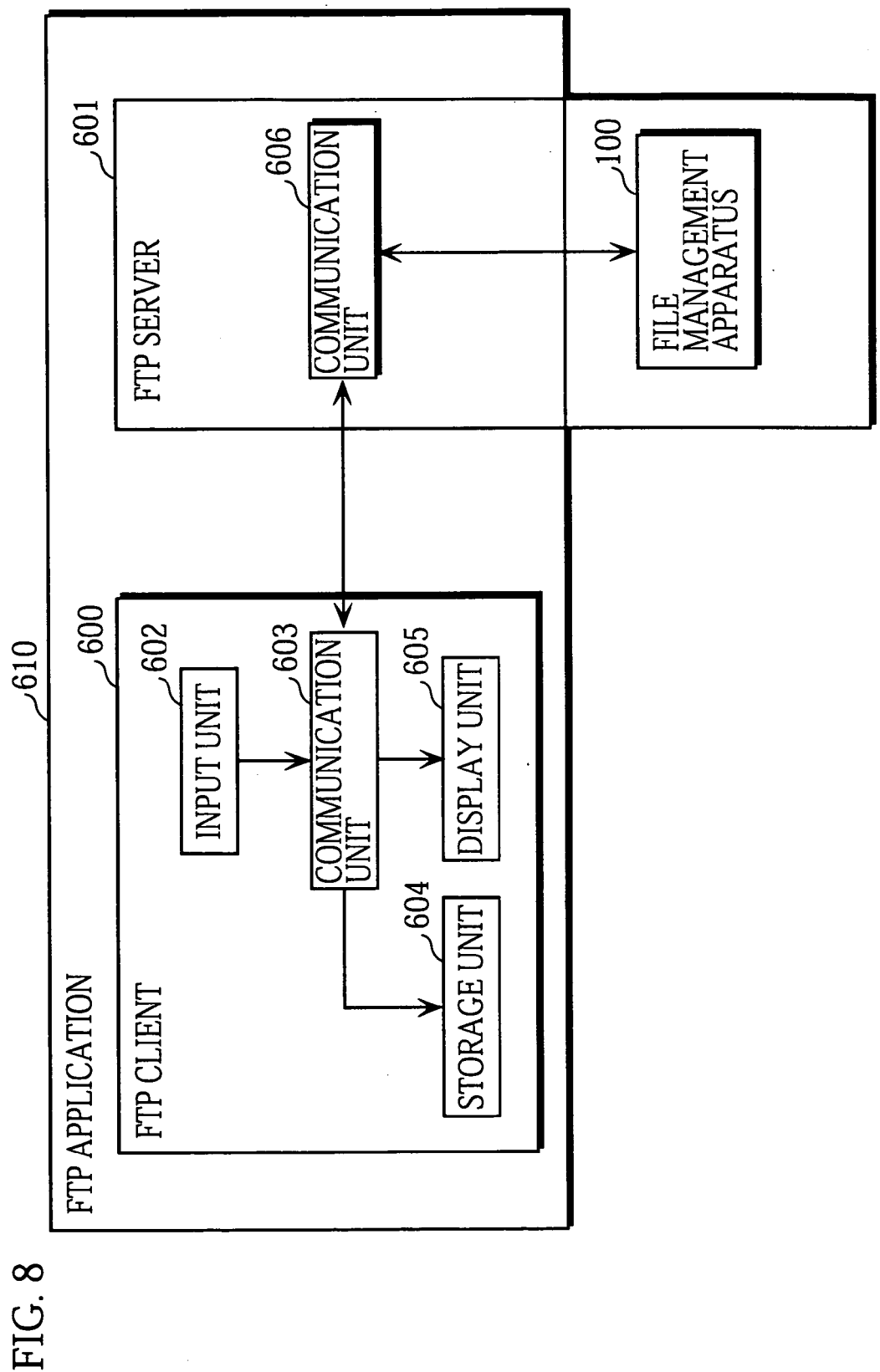
FIG. 8 is a functional block diagram showing the construction of a file transfer system being an application.

The following is a description of an application which uses the file management apparatus of the present embodiment. FIG. 8 is a functional block diagram showing the construction of a file transfer system that is an application using the file management apparatus. Although the application actually transfers segments, not files, the application is called "file transfer system" since it has almost the same construction as a conventional file transfer system except the file management apparatus. As shown in FIG. 8, the file transfer system includes an FTP application 610 and the file management apparatus 100 of the present embodiment. The FTP application 610 includes an FTP client 600 and a part of an FTP server 601.

The FTP client 600 is composed of an input unit 602, a communication unit 603, a storage unit 604, and a display unit 605. The FTP server 601 is composed of the file management apparatus 100 and a communication unit 606.

The input unit 602 of the FTP client 600 receives a request to obtain a segment name from a user. The user requests this by inputting "Dir" on a keyboard. The input unit 602 sends the segment name obtainment request to the FTP server 601, via the communication units 603 and 606. The FTP server 601 sends the segment name obtainment request to the file management apparatus 100. In response to this, the file management apparatus 100 outputs a segment name. The segment name is sent to the FTP client 600 via the communication units 603 and 606, and displayed on the display unit 605 of the FTP client 600. FIG. 9 shows a screen displayed on the display unit 605 of the FTP client 600.

The input unit 602 of the FTP client 600 receives a request to read segment data from a user. The user requests this by inputting "Get_—(a desired segment name)" on a keyboard. The input unit 602 sends the segment data read request to the FTP server 601 via the communication units 603 and 606. The FTP server 601 sends the segment data read request specifying the segment name to the file management apparatus 100. In response to this, the file management apparatus 100 outputs the segment data. The segment data is sent to the FTP client 600 via the communication units 603 and 606, and stored in the storage unit 604 of the FTP client 600. Also, the display unit 605 of the FTP client 600 displays a message indicating that the file transfer has completed. FIG. 10 shows a screen displayed on the display unit 605 of the FTP client 600.

APPLICATION EXAMPLE 2

In this section, an application of the present invention to a moving-image editing system will be described. The moving-image editing system records moving-images captured byte video camera into the file management apparatus.

Figure 11:
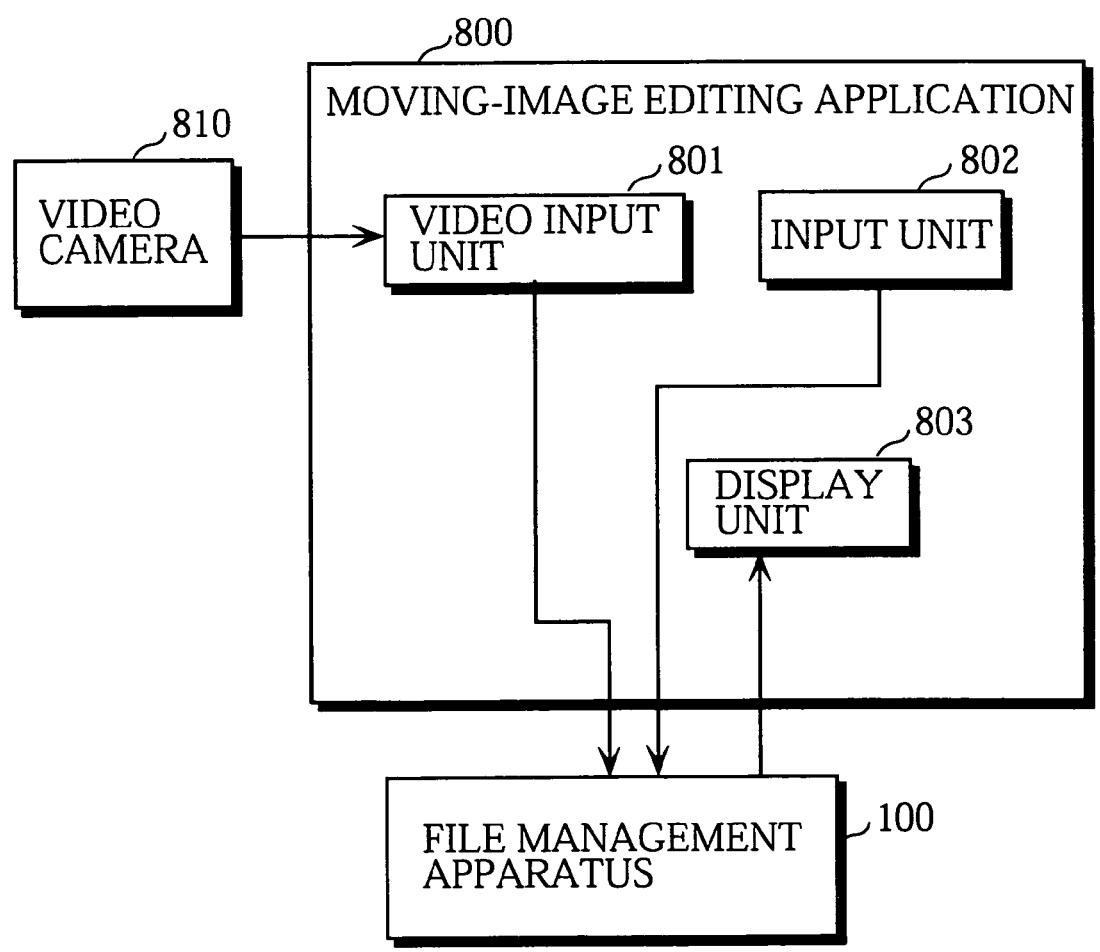
FIG. 11 is a functional block diagram showing the construction of moving-image editing system.

FIG. 11 is a functional block diagram showing the construction of moving-image editing system. As shown in FIG. 11, the moving-image editing system is composed of a video camera 810, a moving-image editing application 800, and the file management apparatus 100 of the present embodiment.

The moving-image editing application 800 is composed of an input unit 802, a video input unit 801, and a display unit 803.

The input unit 802 of the moving-image editing application 800, upon receipt of a key input "DetectSeg" by a user as a request to detect a segment, sends the segment detection request to the file management apparatus 100. When receiving the segment detection request, the file management apparatus 100 detects the segment from a file, and creates segment information.

The input unit 802 of the moving-image editing application 800, upon receipt of a key input "Dir" by a user as a request to obtain a segment name, sends the segment name obtainment request to the file management apparatus 100. When receiving the segment name obtainment request, the file management apparatus 100 outputs the segment name. The display unit 803 displays the segment name.

The input unit 802 of the moving-image editing application 800, upon receipt of a key input "Rec_—(a desired segment name)" by a user as a request to write segment data, sends the segment data write request specifying the segment name to the file management apparatus 100, and at the same time, instructs the video input unit 801 to input a video signal. The video input unit 801 inputs and digitizes the video signal which is sent from the video camera 810, and sends the digital data to the file management apparatus 100. The file management apparatus 100 writes the received digital data onto the specified segment. The input unit 802, upon receipt of a key input "Rec_complete" by the user as an instruction to end writing the segment data, sends the segment data writing end instruction to the file management apparatus 100, and at the same time, instructs the video input unit 801 to end inputting the video signal. When receiving this instruction, the file management apparatus 100 ends writing the segment data.

When receiving a key input "Play_—(a desired segment name)", namely a segment data read request from the user, the input unit 802 sends the segment data read request specifying the segment name to the file management apparatus 100. In response to this, the file management apparatus 100 reads and outputs the specified segment data, then the display unit 803 displays the segment data, namely video data.

<Operation>

Now, the operation of the file management apparatus when the application unit 120 is either the above file transfer system or the moving-image editing system will be described.

Figure 12:
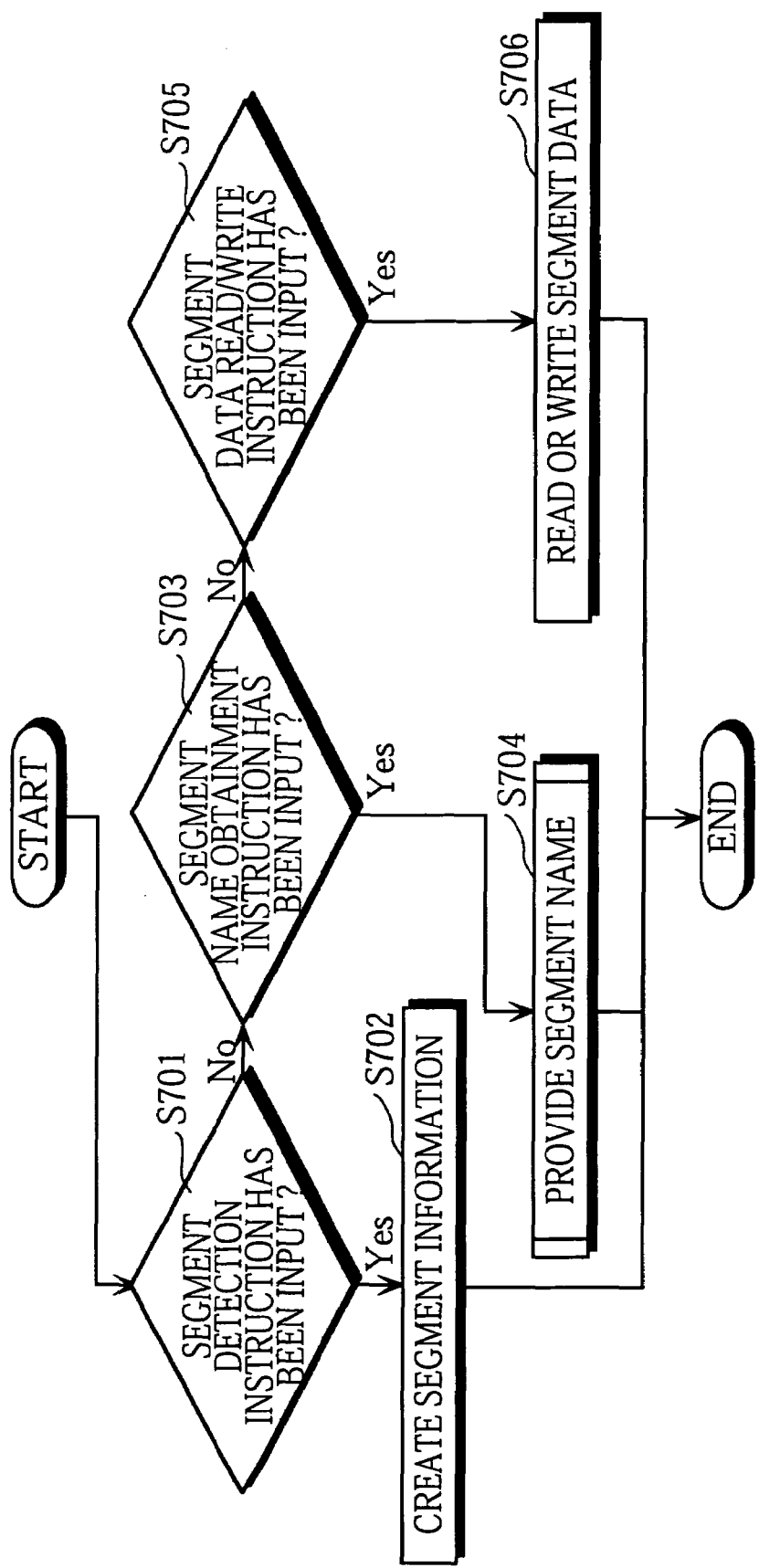
FIG. 12 is a flowchart showing an operation procedure of the file management apparatus.

FIG. 12 is a flowchart showing an operation procedure of the file management apparatus 100. It is supposed in FIG. 12 that initially, the file storage unit 108 stores the files shown in FIG. 2 and the file information storage unit 102 stores the file information shown in FIG. 4.

When the input unit 101 receives, from the application unit 120, instruction "DetectSeg" which is an instruction to detect a segment from a file, the segment information is created (steps S701, S702).

When the input unit 101 receives, from the application unit 120, instruction "Dir" which is an instruction to obtain a segment name, the segment name is provided (steps S703, S704).

When the input unit 101 receives, from the application unit 120, instruction "Get_Sports1" which is an instruction to read segment data or instruction "Rec_Quiz1" which is an instruction to write segment data, the segment data is read or written (steps S705, S706).

<Creation of Segment Information> (Application to Moving-Image Editing System)

First, the operation of creating the segment information will be described.

Figure 13:
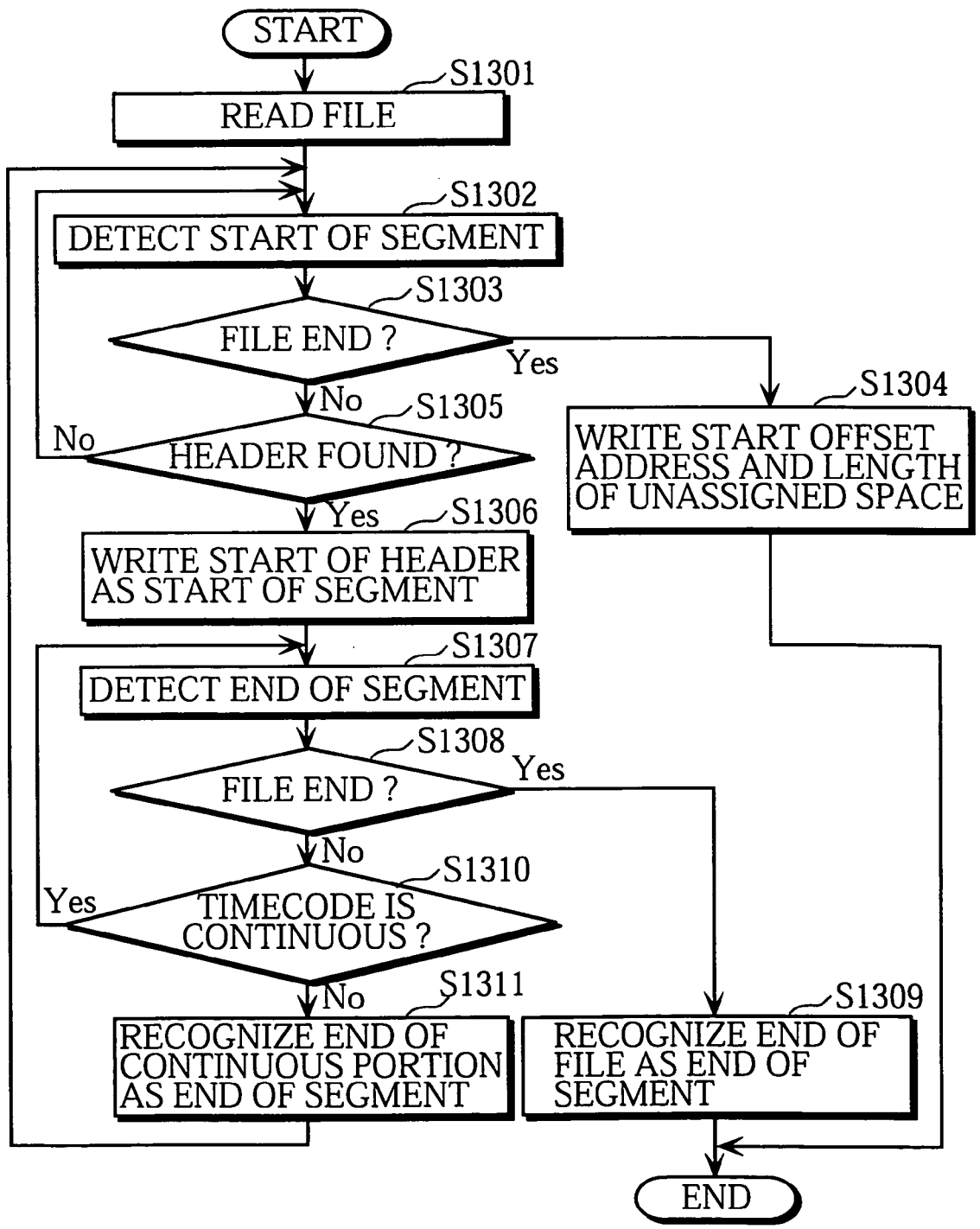
FIG. 13 is a flowchart showing a procedure for creating the segment information.

FIG. 13 is a flowchart showing a procedure for creating the segment information. First, the segment information creation unit 115 reads a file from the file storage unit 108 (step S1301).

The segment information creation unit 115 then checks whether the file includes a start of a segment. That is, the segment information creation unit 115 sequentially checks the file from its start to see whether the file has a header of moving-image data (step S1302).

When the above check ends up in reaching the end of the file, the segment information creation unit 115 creates the segment information for the unassigned space. More specifically, the segment information creation unit 115 detects the start address offset of the unassigned space as an address immediately after the end of the last segment (when the file does not include a segment, the start address of the file, i.e., "0"), and detects the length of the unassigned space and recognizes it as a length between the start address offset to the end of the file, and writes these pieces of information to the segment information storage unit 103 (steps S1303, S1304).

When the above check in step S1302 ends up in finding a header of moving-image data, the segment information creation unit 115 writes the start of the header into the segment information storage unit 103 as the start address offset of the segment. In the case of the "Quiz" file show in FIG. 2, the start address offset of the segment 1 is "0", and the start address offset of the segment 2 is "60 M" (steps S1305, S1306).

The segment information creation unit 115 then Searches for the end of the segment. More specifically, the segment information creation unit 115 searches the file sequentially from the start of the segment towards the end of the file for a timecode missing portion which is either a discontinuity of timecodes or a portion that does not include a timecode (indicating that the portion does not belong to a moving-image frame) (step S1307).

When the above check ends up in reaching the end of the file, the segment information creation unit 115 recognizes the end of the file as the end of the segment, calculates the length between the start and end of the segment, and writes the calculated length to the segment information storage unit 103 as the segment length (steps S1308, S1309).

When the above check in step S1307 ends up in finding a timecode missing portion, the segment information creation unit 115 recognizes the end of the segment as immediately before the timecode missing portion (the end of a timecode consecutive portion), calculates the length between the start and end of the segment, and writes the calculated length to the segment information storage unit 103 as the segment length. In the case of the "Quiz" file shown in FIG. 2, the segment 1 ends with the 798$^{th}$ frame and the length of the segment 1 is recognized as 40 M since the 799$^{th}$ frame cannot be found at 40 M and onwards. Also, the segment 2 ends with the 598$^{th}$ frame and the length of the segment 2 is recognized as 30 M since the 599$^{th}$ frame cannot be found at 90 M and onwards (steps S1310, S1311). As a result of the above operation, the segment information shown in FIG. 5 is created.

<Providing Segment Name> (Application to FTP Application or Moving-Image Editing System)

Figure 14:
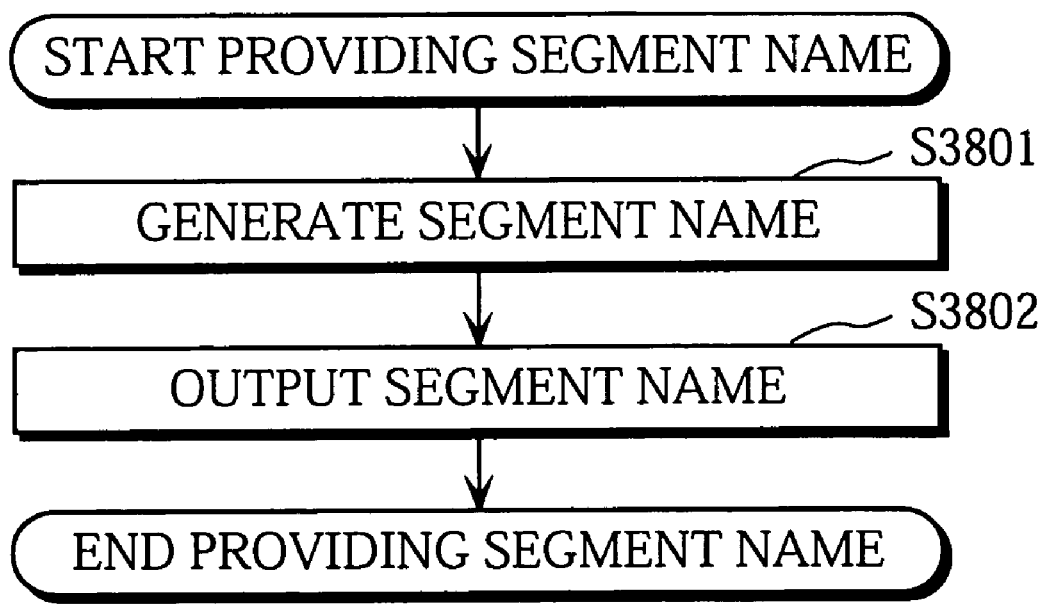
FIG. 14 is a flowchart showing the procedure of providing a segment name.

Now, the operation for providing a segment name will be described. FIG. 14 is a flowchart showing the procedure of providing a segment name.

First, the input unit 101 sends the segment name obtainment instruction (Dir) to the segment name generation unit 104. The segment name generation unit 104 refers to the segment information stored in the segment information storage unit 103 to generate a segment name for each existent segment in accordance with the rule for generating segment names. More specifically, the segment name generation unit 104 generates segment names which each are composed of (1) a file name of a file to which the segment belongs, and (2) a serial number of the segment in the file which is assigned in order of storage in the file. In this example, the segment name generation unit 104 refers to the segment information shown in FIG. 5 and detects that the "Sports" file includes segments 1 to 3, and generates segment names "Sports1", "Sports2", and "Sports3" for the three segments. Also, the segment name generation unit 104 detects that the "Quiz" file includes segments 1 and 2, and generates segment names "Quiz1" and "Quiz2" for the two segments (step S3801).

The segment name output unit 105 outputs the generated segment names to the application (step S3802). As a result of the above operation, the application unit 120 displays the segment names sent from the file management apparatus 100, as shown in FIG. 9.

Figure 15:
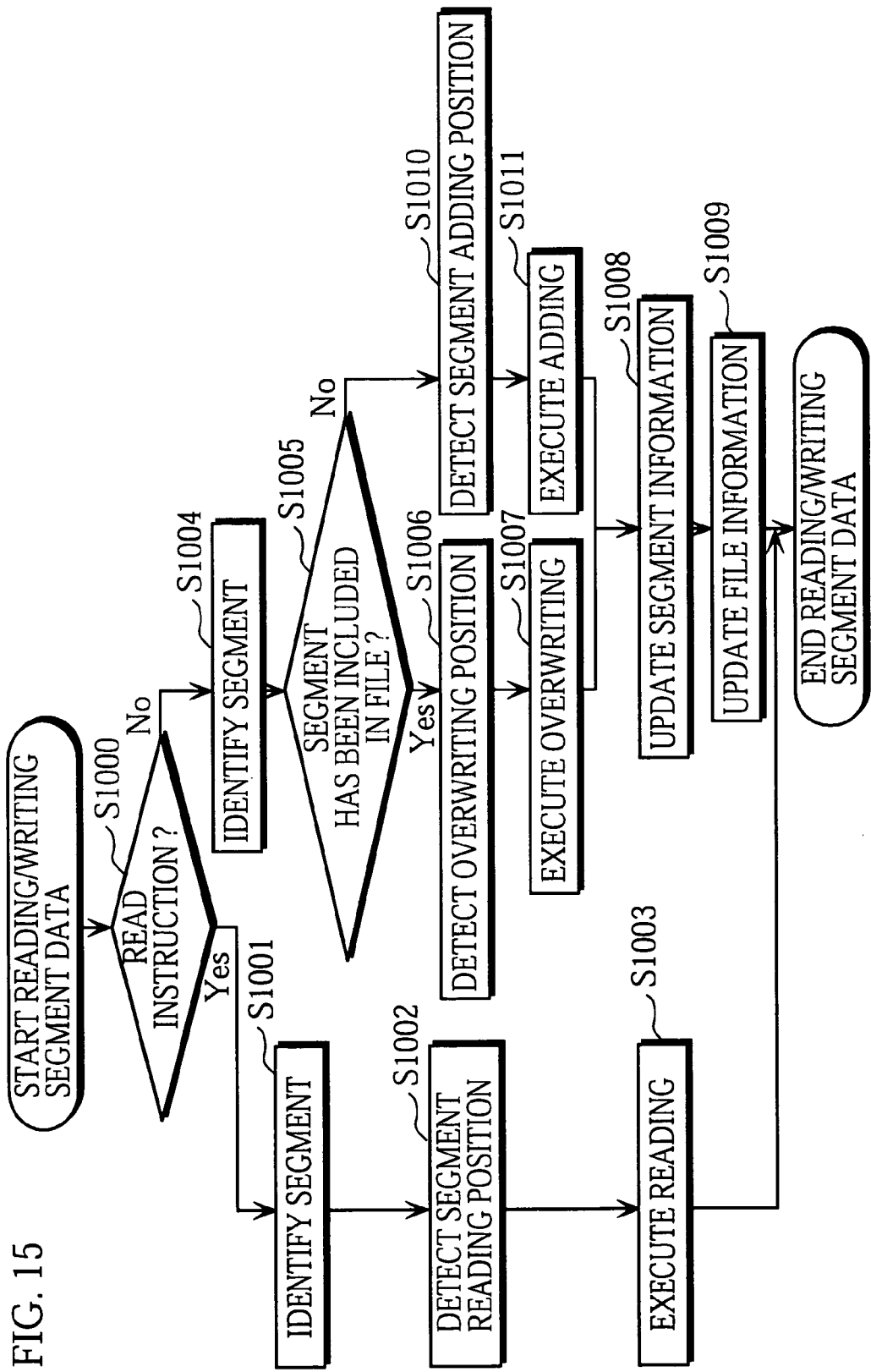
FIG. 15 is a flowchart showing procedures of reading, overwriting, and adding segment data.

Now, the operation of reading and writing the segment data will be described. FIG. 15 is a flowchart showing procedures of reading, overwriting, and adding segment data.

<Reading Segment Data> (Application to FTP Application)

The input unit 101, after receiving a segment data reading instruction ("Get_Sports1") from the FTP application 610, sends the instruction to the segment identification unit 119. The segment identification unit 119 identifies the segment by analyzing the segment name in the instruction in accordance with the rule for generating segment names. More specifically, the segment identification unit 119 analyzes the segment name to identify the file ("Sports") to which the segment belongs and a serial storage-order number of the segment in the file (the first) (steps S1000, S1001).

The segment position detection unit 106 reads, from the file information storage unit 102 and segment information storage unit 103, the start storage position of the file ("Sports") to which the segment belongs, the start address offset ("0n byte") of the segment 1, and the segment length (20 MB), detects the start storage position (absolute address) and the end storage position (absolute address) of the segment, and recognizes the range between the start storage position and the end storage position as the segment reading position (step S1002).

The segment access unit 107 reads the segment data from the segment reading position in the file storage unit 108 detected in step S1002, and outputs the read segment data to the FTP application 610 (step S1003).

<Overwriting Segment Data> (Application to Moving-Image Editing System)

The input unit 101, after receiving a segment data writing instruction ("Rec_Quiz1") from the moving-image editing application 800, sends the instruction to the segment identification unit 119. The segment identification unit 119 identifies the segment by analyzing the segment name in the instruction in accordance with the rule for generating segment names. More specifically, the segment identification unit 119 analyzes the segment name ("Quiz1") to identify the file ("Quiz") to which the segment belongs and a serial storage-order number of the segment in the file (the first), and at the same time, refers to the segment information in the segment information storage unit 103 to check if the "Quiz" file has already included the segment 1, and sends the check result to the segment position detection unit 106. In this example, since the "Quiz" file includes the segment 1, it is judged that the "Quiz" file has already included the segment 1 (steps S1004, S1005).

The segment position detection unit 106 reads, from the file information storage unit 102 and segment information storage unit 103, the start storage position of the "Quiz" file to which the segment belongs, the start address offset of the segment 1, and the start address offset of the segment 2, detects the start storage position (absolute address) of the segment 1 and a storage position (absolute address) immediately before the start storage position of the segment 2, and recognizes the range between these positions as the segment overwriting position (step S1006).

Figure 16:
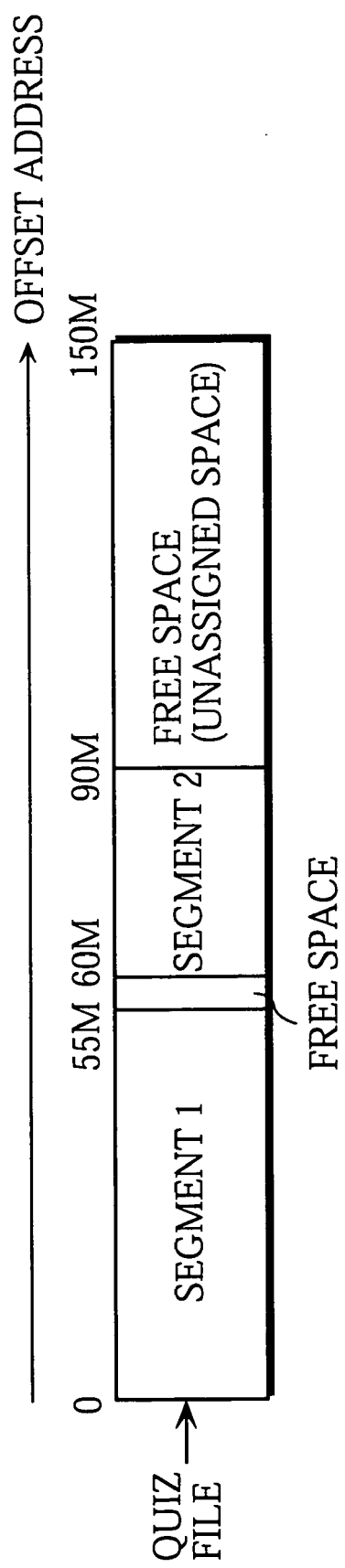
FIG. 16 shows the construction of the "Quiz" file after the segment data has been written therein.

The segment access unit 107 writes the segment data received from the moving-image editing application 800 onto the detected segment overwriting position in the file storage unit 108. The segment access unit 107 stops writing the segment data after receiving the writing end instruction ("Rec_complete") from the moving-image editing application 800 via the input unit 101, notifies the segment information generation unit 115 and the file information generation unit 116 that the writing has completed, and sends the start address offset and segment length of the written segment to the segment information generation unit 115. FIG. 16 shows the construction of the "Quiz" file after the segment data has been written therein. As shown in FIG. 16, a piece of 55 MB segment data has been written starting from the start address offset ("0" byte) of the former segment 1, and has become the new segment 1 ("0" byte to "55 MB"). For achieving this, a part of the original free space ("40 MB" to "60 MB") has been used (step S1007).

The segment information generation unit 115 updates the segment information in the segment information storage unit 103 based on the start address offset and the segment length of the written segment which are sent from the segment access unit 107. More specifically, the segment information generation unit 115 changes the segment length of the segment 1 from "40 MB" to "55 MB". FIG. 17 shows the segment information of the "Quiz" file. As shown in FIG. 17, the segment length of the segment 1 is currently "55 MB" which was "40 MB" before (step S1008).

The file information generation unit 116 updates the file information stored in the file information storage unit 102. That is to say, the file information generation unit 116 changes the "Sports" file creation date to the time when the writing of the segment data completed (step S1009).

<(Adding Segment Data> (Application to Moving-Image Editing System)

The input unit 101, after receiving a segment data writing instruction ("Rec_Quiz3") from the moving-image editing application 800, sends the instruction to the segment identification unit 119. The segment identification unit 119 identifies the segment by analyzing the segment name in the instruction in accordance with the rule for generating segment names. More specifically, the segment identification unit 119 analyzes the segment name ("Quiz3") to identify the file, ("Quiz") to which the segment belongs and a serial storage-order number of the segment in the file (the third), and at the same time, refers to the segment information in the segment information storage unit 103 to check if the "Quiz" file has already included the segment 3. In this example, since the "Quiz" file does not include the segment 3, it is judged that the "Quiz" file does not include the segment 3 (steps S1004, S1005).

The segment position detection unit 106 reads, from the file information storage unit 102 and segment information storage unit 103, the start storage position of the "Quiz" file, and the start address offset and the segment length of the unassigned space of the "Quiz" file, detects the start storage position (absolute address) and the end storage position (absolute address) of the unassigned space, and recognizes the range between these positions as the segment adding position (step S1010).

Figure 18:
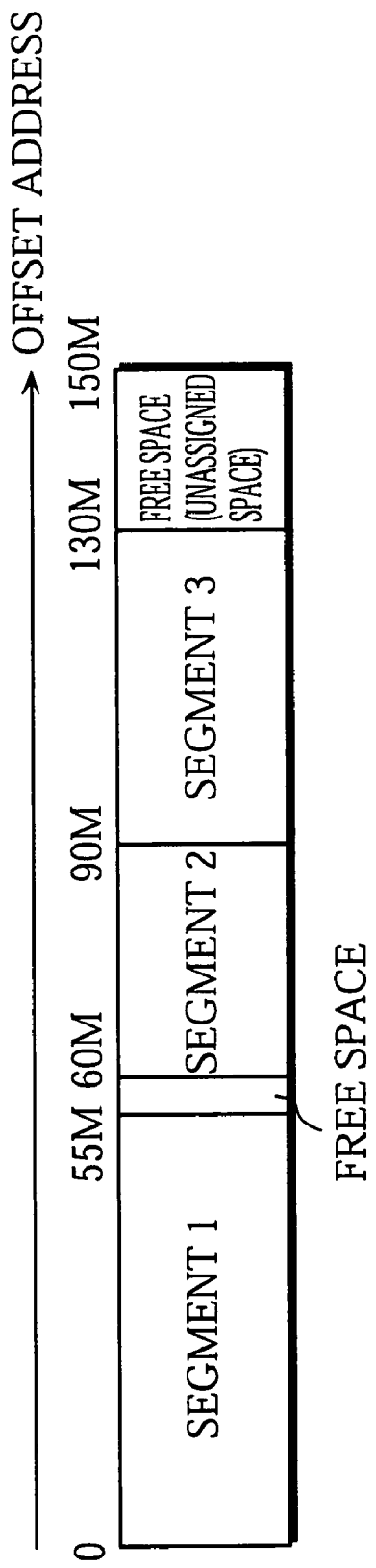
FIG. 18 shows the construction of the "Quiz" file after the segment data has been written therein.

The segment access unit 107 writes the segment data received from the moving-image editing application 800 onto the detected segment adding position in the file storage unit 108. The segment access unit 107 stops writing the segment data after receiving the writing end instruction from the moving-image editing application 800 via the input unit 101, and notifies the segment information generation unit 115 and the file information generation unit 116 that the writing has completed. FIG. 18 shows the construction of the "Quiz" file after the segment data has been written therein. As shown in FIG. 18, a piece of 40 MB segment data has been written starting from the start address offset ("90 MB") of the former unassigned space, and has become the new segment 3 ("90 MB" to "130 MB") (step S1011).

As is the case with the above-described overwriting, the segment information generation unit 115 updates the segment information in the segment information storage unit 103, and the file information generation unit 116 updates the file information stored in the file information storage unit 102.

FIG. 19 shows the segment information of the "Quiz" file. As shown in FIG. 19, information of the segment 3 has been added to the segment information.

Summary of Embodiment 1

As described above, the file management apparatus 100 of the present embodiment operates as follows. When a user sends a segment name obtainment request to the apparatus via an application, the segment name generation unit 104 refers to the segment information storage unit 103 to generate a segment name for each existent segment in accordance with the rule for generating segment names, and sends the generated segment name to the user via the application. Also, upon receipt of a request to access a segment specifying the segment name via the application, the file management apparatus identifies the segment by analyzing the segment name in accordance with the rule for generating segment names, refers to the file information storage unit 102 and the segment information storage unit 103 to detect the segment storage position, then accesses the segment. With this construction of the file management apparatus of the present embodiment, it is possible to access a segment with a simple operation of specifying a segment name, in much the same way as conventional methods access a file by specifying a file name. This reduces the burden on the user.

Also, due to the commonality between the present invention and conventional methods in the methods of specifying access targets, it is substantially possible to allow a conventional application, which accesses a file by specifying a file name, to be used as an application using the file management apparatus of the present invention, by merely adding to the conventional application a function to output an instruction to detect a segment from a file.

Also, since the file management apparatus of the present invention can detect each segment in a file, the user need not record each logical unit as a file with a file name, but has only to record such logical files in a file. This reduces the burden on the user.

Up to this point, the file management apparatus in Embodiment 1 of the present invention has been described. The present invention, however, is not limited to the above embodiment, and can be varied as follows.

(1) Segment Information

In the present embodiment, as shown in FIG. 5, each piece of segment information stored in the segment information storage unit 103 includes a start address offset and a segment length. The segment information, however, may include more detailed information. FIG. 20 shows an example of detailed segment information. As shown in this drawing, when portions of moving image data having consecutive timecodes are regarded as segments, each piece of segment information may include a piece of timecode information (composed of a start time and an end time) for each segment.

(2) Segment Name Obtainment Request

In the present embodiment, as shown in FIG. 9, only a segment name is displayed in response to a segment name obtainment request "dir". However, a file name may be displayed, in addition to a segment name. Also, when the segment information storage unit 103 stores detailed segment information, the detailed information may be displayed. FIG. 21 shows an example where, based on the detailed segment information shown in FIG. 20, a name and detailed information are displayed for each segment and each file. As shown in FIG. 21, the names of the three segments in the "Sports" file and the two segments in the "Quiz" file (Sports1, Sports2, Sports3, Quiz1, and Quiz2) and each segment length, start time, and end time are displayed in relation to segments, and the file names (Sports and Quiz), and each file length, start time, and end time are displayed in relation to files. Here, the file start time is the earliest time among the segment start times of the file, and the file end time is the latest time among the segment end times of the file.

(3) Overwriting Segments

In the file management apparatus 100 of the present embodiment, the segment position detection unit 106 recognizes a range between the start storage position of a specified segment and the storage position immediately before the start storage position of the next segment as the segment overwriting position, so that the segment access unit 107 can write segment data into a free space adjacent the former segment, as well as onto the former segment. The overwriting of segment data, however, is not limited to this.

For example, the segment position detection unit 106 may recognize a range between the start address and the end address of a specified segment as the segment overwriting position, so that the segment access unit 107 can write segment data within this range, that is to say, not to exceed the former segment.

Alternatively, the segment position detection unit 106 may recognize the former segment and a part of another segment as the segment overwriting position, so that the segment access unit 107 can write segment data within this range. In this case: if the rest of the other segment maintains a logical unit after the segment data has been written, the rest of the other segment may be dealt with as a segment as before; and if the rest of the other segment does not maintain a logical unit any more after, the rest of the other segment may be dealt with as a free space.

(4) Adding Segments

In the file management apparatus 100 of the present embodiment, the segment position detection unit 106 recognizes a range between the start address and the end address of the unassigned space (a free space at the end of a file, not a free space between segments) as the segment adding position, so that the segment access unit 107 can additionally write segment data into the segment adding position. The additional writing of segment data, however, is not limited to this. For example, the segment position detection unit 106 may recognize even a free space between segments as the segment adding position if the size of the free space is larger than a certain size. Also, when a segment is added to an unassigned space and when the size of the segment is larger than the size of the unassigned space, data may be written so as not to exceed the file size, or may be written to exceed the file size, namely written to the unassigned space and to a space which is outside the file and adjacent to the unassigned space.

(5) Segment Name

In the file management apparatus 100 of the present embodiment, the rule for generating segment names is that each segment name must be composed of (1) a file name of a file to which the segment belongs, and (2) a serial number of the segment in the file which is assigned in order of storage in the file. The rule, however, is not limited to the above one. FIG. 22 shows another example of the rule for generating segment names. As shown in FIG. 22, the rule states that each segment name must be composed of (1) a file name of a file to which the segment belongs, and (2) an uppercase alphabet indicating a serial storage-order number of the segment in the file. According to this rule, the segment name of the segment 1 of the "Sports" file is "SportsA", and the segment name of the segment 2 of the "Quiz" file is "QuizB", for example. Alternatively, the rule may state that each segment address is composed of (1) a file name of a file to which the segment belongs, and (2) the start address offset and the end address offset of the segment. According to this rule, the segment name of the segment 1 ("0" to "20 MB") of the "Sports" file is "Sports0–20", and the segment name of the segment 2 ("20 MB" to "70 MB") of the "Sports" file is "Sports20–70", for example.

In the present embodiment, the segment name generation unit 104 generates a segment name in accordance with the rule for generating segment names, upon receipt of a request to obtain a segment name. Furthermore, the segment identification unit 119 detects a segment by analyzing the segment name in accordance with the rule for generating segment names. These operations, however, may be achieved in different ways. For example, the segment information storage unit 103 may store generated segment names. To achieve this, the segment information generation unit 115 may create segment position information, and the segment name generation unit 104 may generate a segment name in accordance with the rule for generating segment names, then the generated segment information and segment name may be stored in the segment information storage unit 103 in a manner that their correspondence is shown. Alternatively, the rule for generating segment names may not be used. Instead, the file management apparatus may include a means for allowing the user to create arbitrary segment names so that the segment names are stored in the segment information storage unit 103. FIG. 23 shows an example of the segment information stored in the segment information storage unit 103 in this case. As shown in FIG. 23, the segment information include segment names created by the user.

As in another variation, the segment information stored in the segment information storage unit 103 may include a first table and a second table, the first table showing the segment position information, and the second table showing relationships between (1) segment names, (2) file names of file to which the segments belong, and (3) serial numbers of the segments in the files which are assigned in order of storage in the files, where (2) and (3) are specified by (1). FIG. 24A shows the first table which shows the segment position information. FIG. 24B shows the second table showing relationships between (1) segment names, (2) file names of file to which the segments belong, and (3) serial numbers of the segments in the files which are assigned in order of storage in the files, where (2) and (3) are specified by (1). As shown in FIG. 24B, when a segment name "tennis" is specified, for example, it is found by referring to the second table that the segment name represents the second segment of the "Sports" file, and the position information of the segment ("20M" to "50M") is found by referring to the first table.

With the above construction, when a segment name obtainment request is issued, instead of generating the requested segment name in accordance with the rule for generating segment names, the requested segment name is read from the segment information storage unit 103, and the read segment name is output. Also, when a request for accessing a segment specifying a segment name is issued, the segment identification unit 119 does not identify the segment and the file including the segment by analyzing the specified segment name using the rule for generating segment names, but the segment position information corresponding to the specified segment name is read from the segment information storage unit 103.

In the present embodiment, segments are accessed by way of specifying segment names since it is thought to be desirable that the segment accessing method is close to an existent method used by existent applications in which files are accessed by way of specifying file names. However, in the case of video data to which timecodes are assigned, each segment may be accessed by way of specifying a file name and an access start timecode.

(6) Segment Addresses

In the present embodiment, the start address offset and the segment length included in the segment information stored in the segment information storage unit 103 of the file management apparatus 100 are represented by bytes. The start address offset and the segment length, however, may be represented using other units. For example, they may be represented by frame numbers when segments are moving-image data. Also, the position information in the segment information may be composed of a start address offset and an end address offset, instead of a start address offset and a segment length.

(7) File Length

In the present embodiment, the files stored in the file storage unit 108 of the file management apparatus 100 have fixed length. The files, however, are not limited to the fixed length. For example, the files may have variable-length so that the files may extend as segment data is added thereto.

(8) Timing for Generating Segment Information

In the present embodiment, the segment information generation unit 115 of the file management apparatus 100 creates segment information and stores the created segment information in the segment information storage unit 103 after a file is newly created or after it is notified by the segment access unit 107 that writing of a piece of segment data has completed. This, however, may be differently performed. For example, the segment information generation unit 115, independent of writing segment data, may detect a logical unit in a file every certain time period, recognize it as a segment, and create a piece of segment information (composed of a start address offset and an end address offset) corresponding to the segment.

Alternatively, segment data in files, file information, and segment information may be created by an apparatus different from the file management apparatus 100, then the created segment data, file information, and segment information may be taken in for use by the file storage unit 108, file information storage unit 102, and segment information storage unit 103 of the file management apparatus 100.

In the present embodiment, it is supposed that file storage addresses are consecutive. However, even when file storage addresses are non-consecutive since the files are stored in fragments of the file storage area in the file information storage unit, it is possible to access each segment by storing in the segment information storage unit 103 each pair of a fragment start address offset and its length as the segment position information. This is because it is possible to access a segment based on the position information.

(9) Segment Name Output

In the present embodiment, the segment name output unit 105 of the file management apparatus outputs only segment names generated by the segment name generation unit 104 to the application unit 120. This may be achieved by a different method. For example, the segment name output unit 105 may read the start address offset and the end address offset of the segment from the segment information storage unit 103, and output the addresses and the segment name to the application unit 120. Also, the segment name output unit 105, when a segment is a sequence of pieces of moving-image data having consecutive timecodes, may read the first frame of the segment from the file storage unit 108, and output the read frame to the application unit 120 so that the application unit 120 displays the frame (still picture).

(10) Application Examples

In the present embodiment, applications relating to file transfers or recording are introduced as the applications that can use the file management apparatus of the present embodiment. However, other applications such as an application for reproducing moving images can use the file management apparatus of the present embodiment.

(11) Segments

In the present embodiment, a sequence of pieces of video data having consecutive timecodes are recognized as a segment. Conditions for defining the segment, however, are not limited to video data nor timecodes. For example, a sequence of pieces of measurement data having consecutive measurement timecodes may be recognized as a segment. Also, a sequence of pieces of data having consecutive serial numbers (e.g., ID numbers for database) may be recognized as a segment.

Also, any meaning-based logical unit or format-based logical unit may be regarded as a segment. For example, change of scenes in moving-image data may be detected so that each scene is regarded as a segment (meaning-based logical unit). Also, each of a plurality of chapters constituting text data may be regarded as a segment (format-based logical unit).

(12) Obtaining Files, File Information, or Segment Information

In the present embodiment, files and file information are stored beforehand. Files and file information, however, may be obtained from outside to be stored inside. Also, in the present embodiment, segment information is created by the apparatus of the embodiment, but it also may be obtained from outside to be stored inside.

Embodiment 2

Embodiment 2 relates to a file management apparatus that reads, overwrites, or adds data in units of segment set data, where each segment set is composed of all segments included in a file. The present embodiment is suitable for the case where the user wants to copy or transfer all the segments in a file when the file includes segment portions and other portions, each segment being a logical unit.

<Construction>

Figure 25:
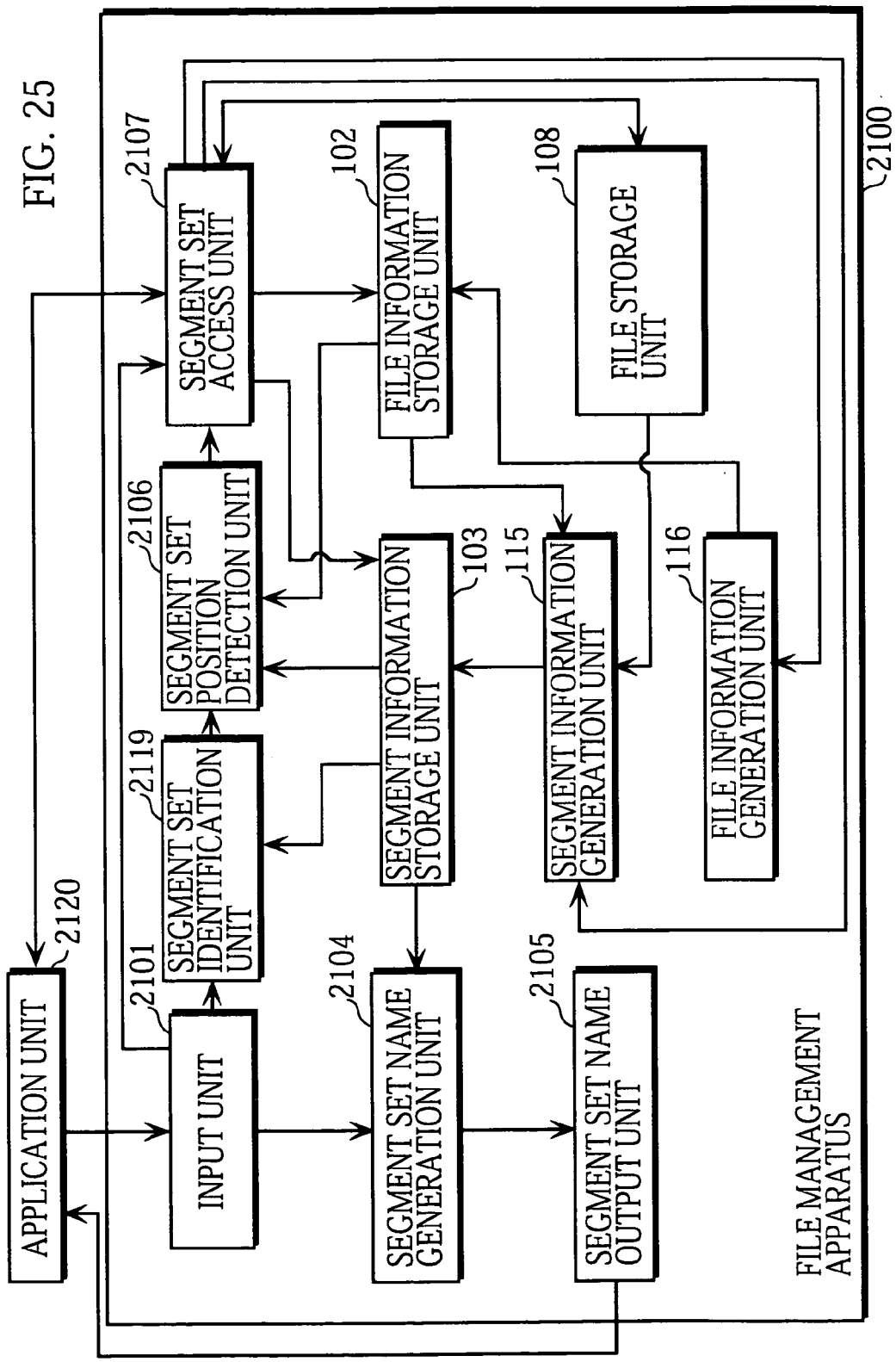
FIG. 25 is a functional block diagram showing the construction of the file management apparatus in Embodiment 2.

FIG. 25 is a functional block diagram showing the construction of the file management apparatus in the present emboiment.

The file storage unit 108, file information storage unit 102, and segment information storage unit 103 of the present embodiment are the same as Embodiment 1. The following is a description of components that are different from Embodiment 1.

The application unit 2120 reads or writes data in units of segment sets using the file management apparatus 2100. The application unit 2120, for example, can substantially be achieved by a conventional FTP program which performs a conventional file transfer process (except that the application unit 2120 additionally has a function to detect a segment). It should be noted here that a segment set is composed of all segments in a file. FIGS. 24A and 24B show examples of segment sets in files. As shown in FIG. 26A, the segment set 2201 of the "Sports" file is composed of three segments. As shown in FIG. 26B, the segment set 2202 of the "Quiz" file is composed of two segments.

The input unit 2101 receives a segment set name obtainment request and a segment set data read, overwrite, or adding request specifying a segment set from the application unit 2120.

The segment set name generation unit 2104 refers to the segment information storage unit 103 to check whether a segment has already been stored (i.e., whether a segment set has already been stored), and generates segment set names for the segment sets currently stored in the segment information storage unit 103. The segment set name is composed of a file name of a file to which the segment belongs, and a sign indicating segment set (in this example, "+"). The segment set name may not be generated each time a segment name obtainment request is received, but may be assigned to each segment set uniquely in advance since a segment set name does not change, in contrast to a segment name, even if a segment is added to the segment set. In this example, a segment set name "Sports+" is generated for the segment set in the "Sports" file, and a segment set name "Quiz+" is generated for the segment set in the "Quiz" file. Note that use of the character "+" at the last of a file name is forbidden to avoid overlaps between segment set names and file names.

The segment set name output unit 2105 outputs segment set names generated by the segment set name generation unit 2104 to the application unit 120.

The segment set identification unit 2119 analyzes a segment set name sent from the input unit 2101 to detect a file name of a file to which the segment set belongs, and sends the detected file name to the segment set position detection unit 2106.

The segment set position detection unit 2106 detects the segment set reading, overwriting, or adding position of the segment set identified by the segment set identification unit 2119. More specifically, the segment set position detection unit 2106 reads, from the file information storage unit 102, the start address of the file to which the segment set belongs.

In the case of reading segment set data, the segment set position detection unit 2106 reads, from the segment information storage unit 103, the start address offset and segment length of each segment included in the file, and recognizes a set of ranges of all segments in the file as the segment set reading position, each segment ranging from the start storage position (absolute address) to the end storage position (absolute address). For example, upon receipt of a segment set reading request specifying segment set "Quiz+", the segment set position detection unit 2106 detects portions ("0"–"40M" and "60M"–"90M") of the "Quiz" file as the segment set reading position.

In the case of overwriting segment set data, the segment set position detection unit 2106 recognizes a range between the start and the end of a file as the segment set overwriting position. For example, upon receipt of a segment set overwriting request specifying segment set "Sports+", the segment set position detection unit 2106 recognizes a portion ("0"–"150M") of the "Sports" file as the segment set overwriting position. Accordingly, in the case of overwriting segment set data, it is possible to write segment set data even onto a formerly free space.

In the case of adding segment set data, the segment set position detection unit 2106 reads, from the segment information storage unit 103, the start address offset and the segment length of the unassigned space in the file, and detects a range between the start and the end of the unassigned space as the segment set adding position. For example, upon receipt of a segment set adding request specifying segment set "Sports+", the segment set position detection unit 2106 recognizes a portion ("110M"–"150M") of the "Sports" file as the segment set adding position.

The segment set access unit 2107 reads, overwrites, or adds segment set data from/to the segment set reading, overwriting, or adding position detected by the segment set position detection unit 2106, as will be described.

In the case of reading segment set data, the segment set access unit 2107 reads segment set data from the detected reading position in the file storage unit 108, and outputs the read data to the application unit 2120.

In the case of overwriting segment set data, the segment set access unit 2107 writes segment set data sent from the application unit 2120 onto the detected segment set overwriting position in the file storage unit 108. In the case of adding segment set data, the segment set access unit 2107 writes segment set data sent from the application unit 2120 onto the detected segment set adding position in the file storage unit 108.

The segment set access unit 2107 stops writing the segment set data after receiving the writing end instruction from the application unit 2120 via the input unit 2101, notifies the segment information generation unit 115 and the file information generation unit 116 that the writing has completed, and sends the start address offset and the segment length of the written segment to the segment information generation unit 115.

<Operation>

Now, the operation of the file management apparatus adopting a file transfer system or a recording application as the application 2120 will be described.

Figure 27:
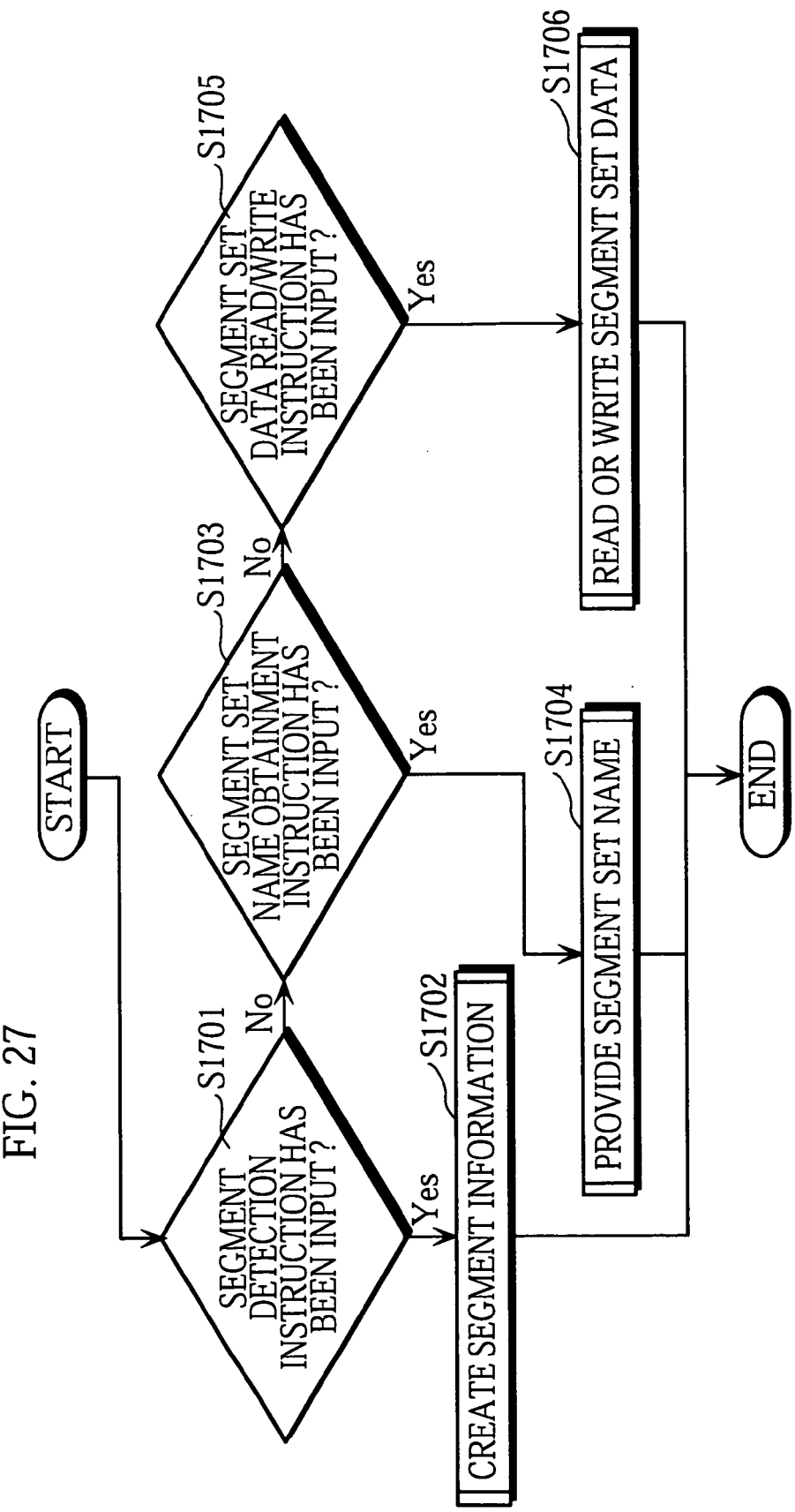
FIG. 27 is a flowchart showing an operation procedure of the file management apparatus in Embodiment 2.

FIG. 27 is a flowchart showing an operation procedure of the file management apparatus 2100. It is supposed in FIG. 27 that initially, the file storage unit 108 stores the files shown in FIG. 26 and the file information storage unit 102 stores the file information shown in FIG. 4.

When the input unit 2101 receives, from the application unit 2120, instruction "DetectSeg" which is an instruction to detect a segment from a file, the segment information is created (steps S1701, S1702).

When the input unit 2101 receives, from the application unit 2120, instruction "Dir" which is an instruction to obtain a segment set name, the segment set name is provided (steps S1703, S1704).

When the input unit 2101 receives, from the application unit 2120, instruction "Get_Sports+" which is an instruction to read segment set data or instruction "Rec_Quiz+" which is an instruction to write segment set data, the segment set data is read or written (steps S1705, S1706).

<Creation of Segment Information> (Application to Moving-Image Editing System)

The operation of creating the segment information in the present embodiment is the same as Embodiment 1, and therefore will be omitted.

<Providing Segment Set Name> (Application to FTP Application or Moving-Image Editing System)

Figure 28:
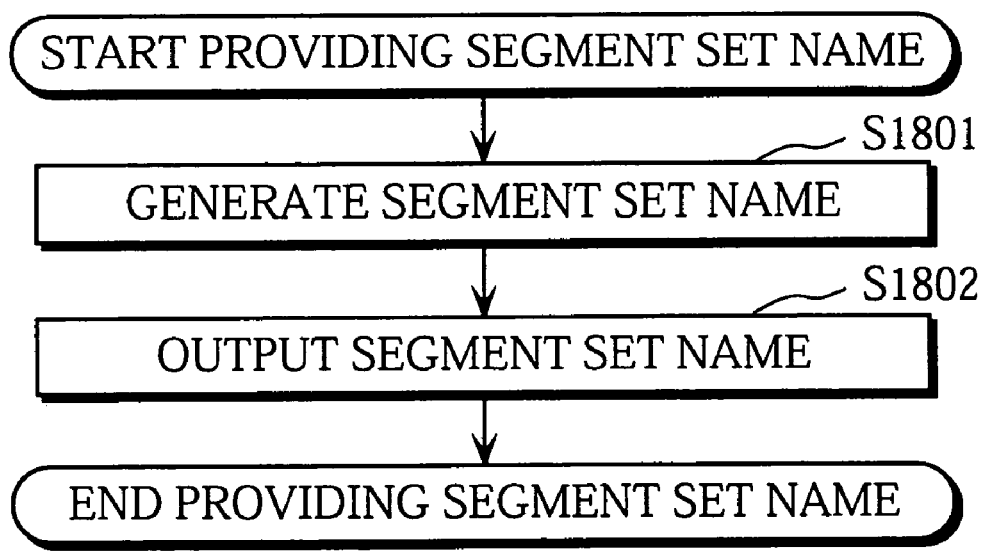
FIG. 28 a flowchart showing the procedure of providing a segment set name.

Now, the operation for providing a segment set name will be described. FIG. 28 is a flowchart showing the procedure of providing a segment set name.

First, the input unit 2101 sends the segment set name obtainment instruction (Dir) to the segment set name generation unit 2104. The segment set name generation unit 2104 refers to the segment information stored in the segment information storage unit 103 to generate a segment set name for each existent segment set. More specifically, the segment set name generation unit 2104 generates segment set names which each are composed of (1) a file name of a file to which the segment set belongs, and (2) the identification sign "+". In this example, the segment set name generation unit 2104 generates a segment set name "Sports+" for a set of the three segments in the "Sports" file. Also, the segment set name generation unit 2104 generates a segment name "Quiz+" for a set of the two segments in the "Quiz" file (step S1801).

The segment set name output unit 2105 outputs the generated segment set names to the application unit 2120 (step S1802).

Figure 29:
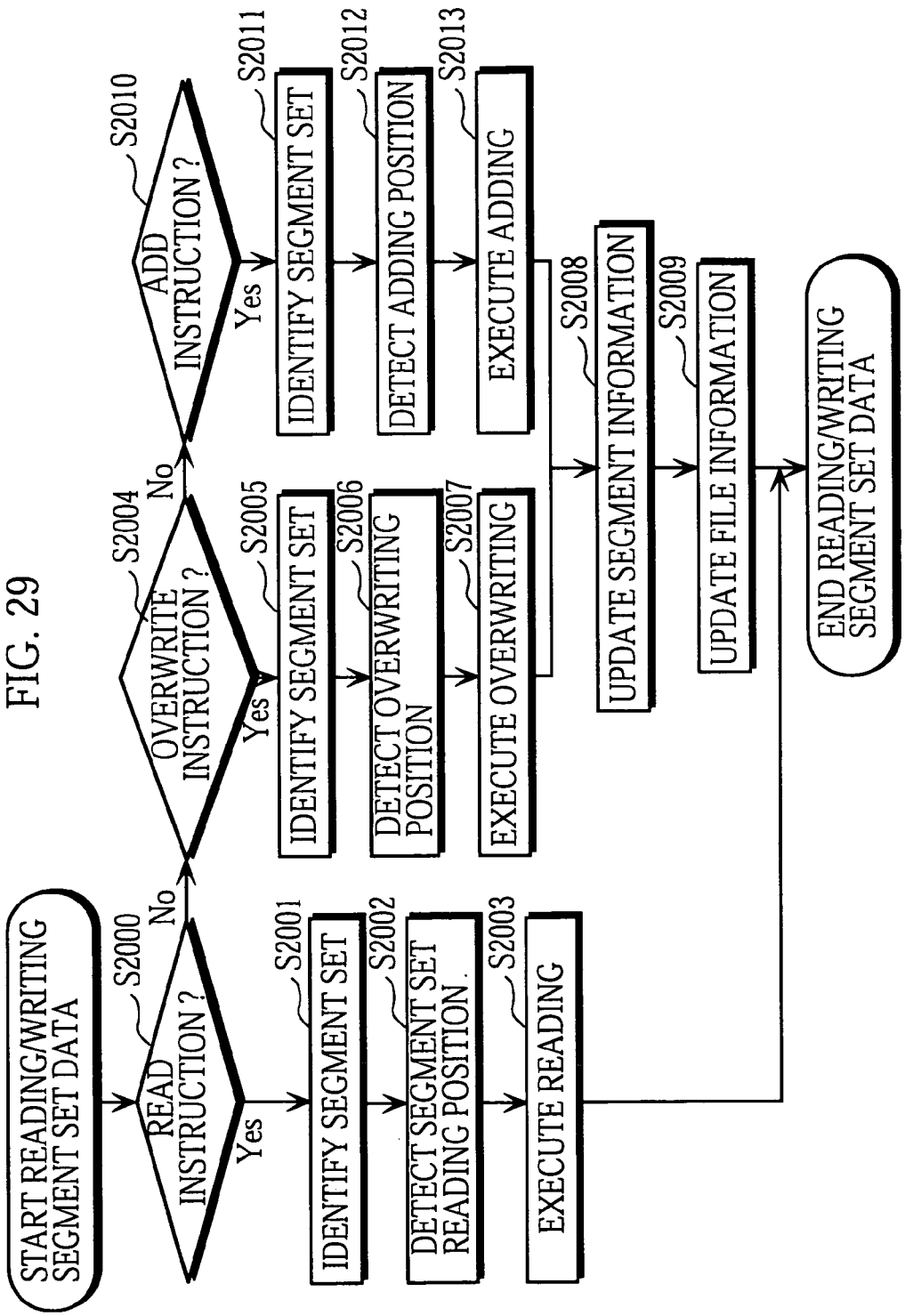
FIG. 29 is a flowchart showing procedures of reading, overwriting, and adding segment set data.

Now, the operation of reading and writing the segment set data will be described. FIG. 29 is a flowchart showing procedures of reading, overwriting, and adding segment set data.

<Reading Segment Set Data> (Application to FTP Application)

The input unit 2101, after receiving a segment set data reading instruction ("Get_Sports+") from the FTP application 610, sends the instruction to the segment set identification unit 2119. The segment set identification unit 2119 identifies the file (Sports) to which the segment set belongs by analyzing the segment set name (steps S2000, S2001).

The segment set position detection unit 2106 reads the start storage position of the file ("Sports") to which the segment set belongs, the start storage positions (absolute addresses) of the segments 1–3, and the length of segments 1–3, detects the start storage position (absolute address) and the end storage position (absolute address) of each of the segments 1–3, and recognizes each range between the start storage position and the end storage position as the segment set reading position (step S2002).

Figure 30:
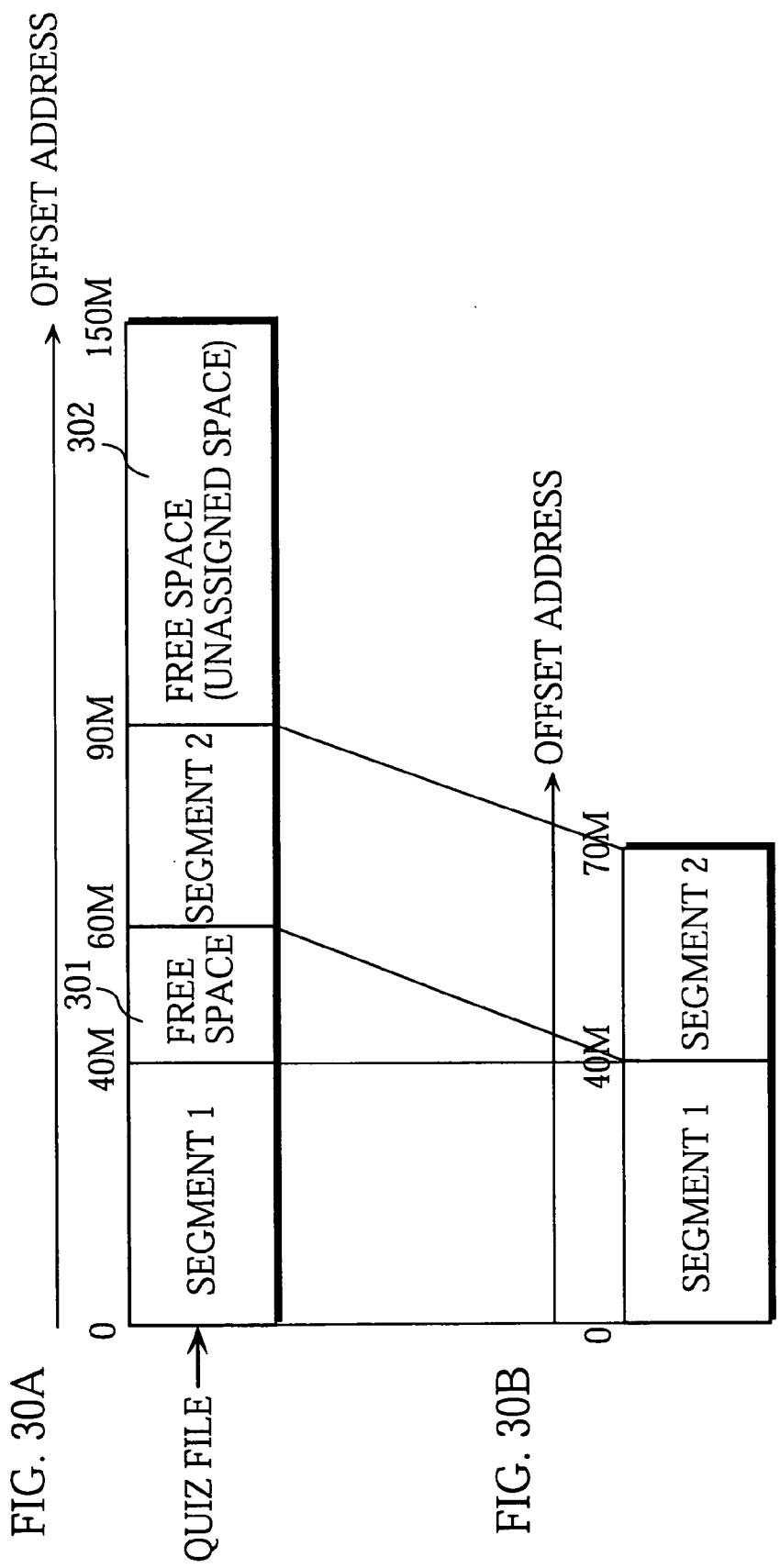
FIG. 30A shows segments included in the "Quiz" file stored in the file management apparatus 100 of the FTP server 601 shown in FIG. 8.
FIG. 30B shows a segment set which is output to the FTP application 610 and stored in the storage unit 604 of the FTP client 600.

The segment set access unit 2107 reads the segment set data from the segment set reading position in the file storage unit 108 detected in step S2002, and outputs the read segment set data to the FTP application 610. FIG. 30A shows segments included in the "Quiz" file stored in the file management apparatus 100 of the FTP server 601 shown in FIG. 8. FIG. 30B shows a segment set which is output to the FTP application 610 and stored in the storage unit 604 of the FTP client 600. More specifically, the drawing shows that the segment set composed of the segment 1 and segment 2 is sent to the FTP application 610 of the FTP server 601, then sent to the FTP client 600 via the communication units 606 and 603 in the same way as ordinary files, and stored in the storage unit 604 (step S2003).

<Overwriting Segment Set Data> (Application to Moving-Image Editing System)

The input unit 2101, after receiving a segment set data overwriting instruction ("Rec_Quiz+") from the moving-image editing application 800, sends the instruction to the segment set identification unit 2119. The segment set identification unit 2119 identifies the file (Quiz) to which the segment set belongs by analyzing the segment set name (Quiz+) (steps S2004, S2005).

The segment set position detection unit 2106 reads the start storage position of the "Quiz" file to which the segment set belongs, and recognizes the range between the start and end of the "Quiz" file as the segment set overwriting position (step S2006).

Figure 31:
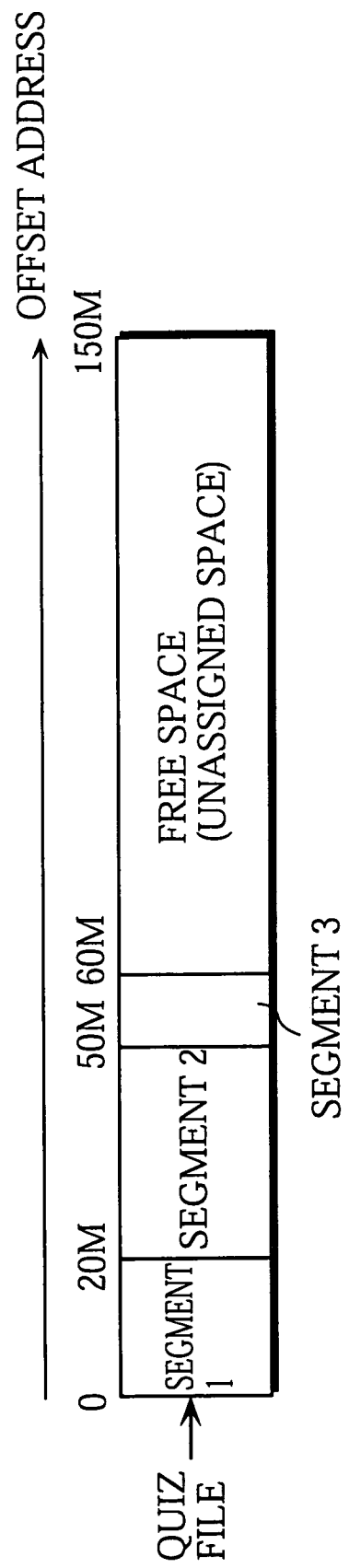
FIG. 31 shows the construction of the "Quiz" file after the segment set data has been written therein.

The segment set access unit 2107 writes the segment set data received from the moving-image editing application 800 onto the detected segment set overwriting position in the file storage unit 108. The segment set access unit 2107 stops writing the segment set data after receiving the writing end instruction ("Rec_complete") from the moving-image editing application 800 via the input unit 2101, notifies the segment information generation unit 115 and the file information generation unit 116 that the writing has completed, and sends the start address offset and segment length of the written segment to the segment information generation unit 115. FIG. 31 shows the construction of the "Quiz" file after the segment set data has been written therein. As shown in FIG. 31, a piece of segment set data composed of pieces of 20 MB, 30 MB, and 10 MB data has been written in the file from the start, and segment 1 ("0" byte to "20 MB"), segment 2 ("20 MB" to "50 MB"), and segment 3 ("50 MB" to "60 MB") have been created (step S2007).

The segment information generation unit 115 updates the segment information in the segment information storage unit 103 based on the start address offset and the segment length of the written segment which are sent from the segment set access unit 2107. FIG. 32 shows the segment information of the "Quiz" file after an update. As shown in FIG. 32, the segment information of the "Quiz" file has been updated to show the start address offsets and segment lengths of the newly created segments 1 to 3 and the unassigned space (step S2008).

The file information generation unit 116 updates the file information stored in the file information storage unit 102. That is to say, the file information generation unit 116 changes the Sports" file creation date to the time when the writing of the segment set data completed (step S2009).

<Adding Segment Set Data> (Application to Moving-Image Editing System)

The input unit 2101, after receiving a segment set adding instruction ("Recadd_Quiz+") from the moving-image editing application 800, sends the instruction to the segment set identification unit 2119. The segment set identification unit 2119 identifies the file (Quiz) to which the segment set belongs by analyzing the segment set name (Quiz+) (steps S2010, S2011).

The segment position detection unit 2106 reads the start storage position of the "Quiz" file and the start address offset and the segment length of the unassigned space of the "Quiz" file, detects the start storage position (absolute address) and the end storage position (absolute address) of the unassigned space, and recognizes the range between these positions as the segment set adding position (step S2012).

Figure 33:
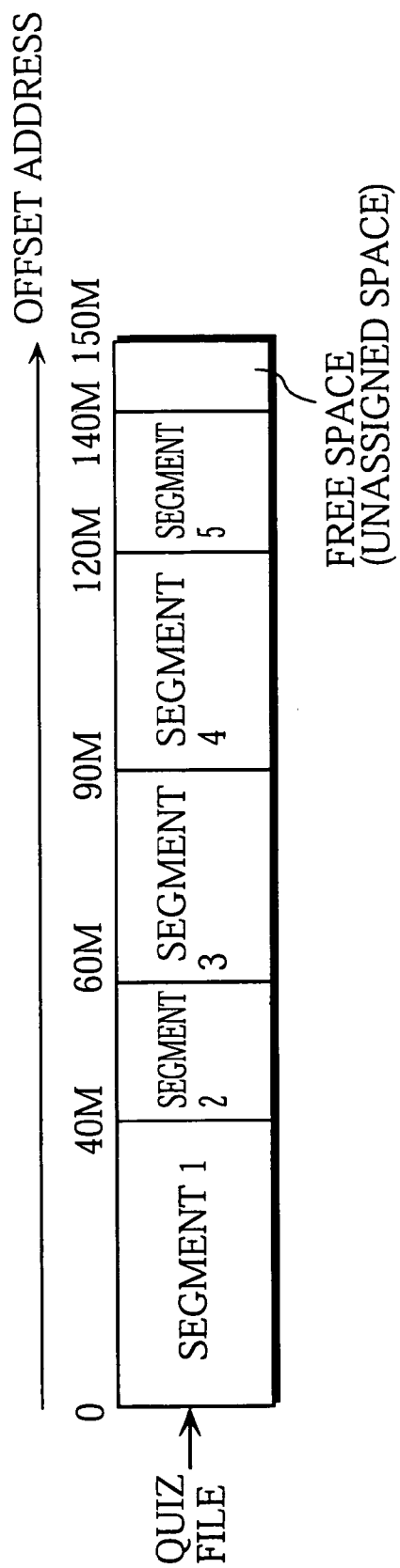
FIG. 33 shows the construction of the "Quiz" file after the segment set data has been written therein.

The segment set access unit 2107 writes the segment set data received from the moving-image editing application 800 onto the detected segment set adding position in the file storage unit 108. The segment set access unit 2107 stops writing the segment set data after receiving the writing end instruction from the moving-image editing application 800 via the input unit 2101, and notifies the segment information generation unit 115 and the file information generation unit 116 that the writing has completed. FIG. 33 shows the construction of the "Quiz" file after the segment set data has been written therein. As shown in FIG. 33, a piece of segment set data composed of pieces of 30 MB and 20 MB segment data has been written starting from the start address offset ("90 MB") of the former unassigned space, and a segment 3 ("90 MB" to "120 MB") and segment 3 ("120 MB" to "140 MB") have been created (step S2013).

As is the case with the above-described overwriting, the segment information generation unit 115 updates the segment information in the segment information storage unit 103, and the file information generation unit 116 updates the file information stored in the file information storage unit 102. FIG. 34 shows the updated segment information of the "Quiz" file. As shown in FIG. 34, information of the segments 4 and 5 has been added to the segment information (steps S2008, S2009).

Summary of Embodiment 2

As described above, the file management apparatus of the present embodiment enables the user to specify a segment set name to access a segment set in a file which includes segment portions constituting the segment set and other portions. With this construction, the user can access a segment set with a simple operation of specifying a segment set name, in much the same way as conventional methods access a file by specifying a file name. This reduces the burden on the user.

Up to this point, the file management apparatus in Embodiment 2 of the present invention has been described. The present invention, however, is not limited to the above embodiment, and can be varied as follows.

(1) Overwriting Segment Sets

In the file management apparatus 2100 of the present embodiment, the segment set position detection unit 2106 recognizes a range between the start and end of a file as the segment set overwriting position, so that the segment set access unit 2107 can write segment data into free spaces, as well as onto the former segments. The overwriting of segment data, however, is not limited to this. For example, the segment set position detection unit 2106 may recognize the former segment portion as the segment set overwriting position, so that the segment set access unit 2107 can write segment set data within this range, that is to say, not to exceed the former segment range.

Alternatively, the segment 1 and segment 2 in the segment set sent from the application may be written within the range of the former segment 1 and segment 2, respectively.

In the present embodiment, a range between the start and end of a file is specified as a maximum writing position. The range, however, is not limited to this. For example, data may be written exceeding the former size of the file by increasing the size of the file.

In the present embodiment, segments are updated in units of segment set data. However, segments may be updated in units of segment data. That is to say, the application may send one piece of segment data at a time, and each received piece of segment data may be written into the segment set overwriting position.

(2) Adding Segment Sets

In the file management apparatus 2100 of the present embodiment, the segment set position detection unit 2106 recognizes a range between the start address and the end address of the unassigned space (a free space at the end of a file, not a free space between segments) as the segment set adding position, so that the segment set access unit 2107 can additionally write segment set data into the segment adding position. The additional writing of segment set data, however, is not limited to this. For example, the segment set position detection unit 2106 may recognize even a free space between segments as the segment set adding position if the size of the free space is larger than a certain size.

Also, in the present embodiment, addition of segment sets is recognized as addition of segment set data. It, however, may be recognized as addition of segment data. That is to say, the application may send one piece of segment data at a time, and each received piece of segment data may be written into the segment set adding position.

In the file management apparatus of the present embodiment, segment sets sent from the moving-image editing application 800 are written into an unassigned space. However, this is not the only way for achievement. For examples when a plurality of segments are included in a file, only segments may be extracted from the file by referring to the segment information and a set of the extracted segments may be added (written) as a segment set. Alternatively, a file including segments may be added (written), together with the unassigned space, to an unassigned space of another file (addition target file).

When a segment, a segment set, or a file larger than an unassigned space of another file is added (written) to the unassigned space, the data may be written so as not to exceed the file size, or may be written to exceed the file size, namely written to the unassigned space and to a space which is outside the file and adjacent to the unassigned space.

(3) Segment Set Name Obtainment Request

In the present embodiment, only a segment set name is displayed in response to a segment set name obtainment request "Dir". However, as is the case with a variation example written in (2) for Embodiment 1, a file name may be displayed together with a segment set name. Also, when the segment information storage unit 103 stores detailed segment information such as a segment length, start time, and end time, the following information may be displayed also: segment set length (a total of segment lengths), segment set start time (the earliest time among start times of the segments belonging to the segment set), and segment set end time (the latest time among end times of the segments belonging to the segment set).

Embodiment 3

Embodiment 3 relates to a file management apparatus that reads, overwrites, or adds data in units of any of segments, segment sets, and files <Construction>

Figure 35:
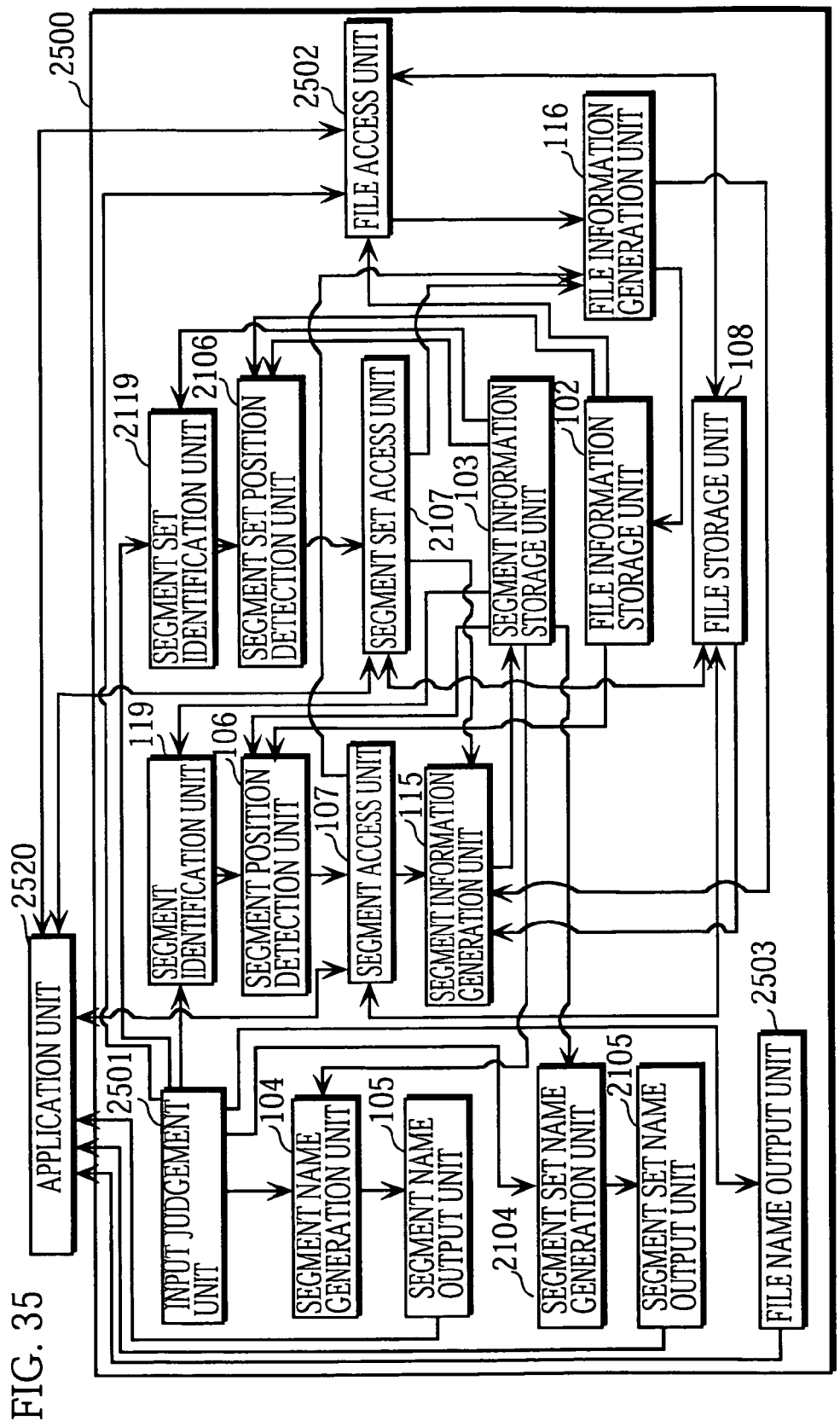
FIG. 35 is a functional block diagram showing the construction of the file management apparatus in Embodiment 3.

FIG. 35 is a functional block diagram showing the construction of the file management apparatus in the present embodiment. In FIG. 35, the components being the same as those in Embodiment 1 or 2 are assigned the same reference numbers. Here, only different components will be described.

The application unit 2520 reads or writes data in units of segments, segment sets, or files using the file management apparatus 2500. The application unit 2520 sends a request to obtain a segment name, a segment set name, or a file name to the file management apparatus 2500, and receives the requested name from the file management apparatus 2500. The application unit 2520 also sends a request to read data specifying an access target name to the file management apparatus 2500, and receives the requested data from the file management apparatus 2500. The application unit 2520 also sends a request to write data specifying an access target name to the file management apparatus 2500, and sends the write-target data to the file management apparatus 2500. Here, the application unit 2520 merely sends a name to the file management apparatus 2500 regardless of the access target type, and the file management apparatus 2500 analyzes the received name and detects which of a file name, a segment name, or a segment set name it has received. That is to say, the application unit 2520 uses only one method common to three types of the access targets.

The input judgement unit 2501 judges which of a segment, a segment set, and a file the input instruction is to deal with. For example, when receiving the instruction "Dir", the input judgement unit 2501 judges that the input instruction is a file name obtainment request, and sends the request to the file name output unit 2503. When receiving the instruction "Dirseg", the input judgement unit 2501 judges that the input instruction is a segment name obtainment request, and sends the request to the segment name generation unit 104. When receiving the instruction "Dirsegset", the input judgement unit 2501 judges that the input instruction is a segment set name obtainment request, and sends the request to the segment set name generation unit 2104. When receiving the instruction "Dirall", the input judgement unit 2501 judges that the input instruction is a request to obtain all of a file name, a segment name, and a segment set name, sends a file name obtainment request to the file name output unit 2503, a segment name obtainment request to the segment name generation unit 104, and a segment set name obtainment request to the segment set name generation unit 2104.

The input judgement unit 2501 judges that the access target is a segment when the last character of the access target specified in the writing or reading instruction is a numeral, and sends the instruction to the segment identification unit 119. The input judgement unit 2501 judges that the access target is a segment set when the last character of the access target is "+", and sends the instruction to the segment set identification unit 2119. Otherwise, the input judgement unit 2501 judges that the access target is a file, and sends the instruction to the file access unit 2502. For example, "Get_Sports1" is judged as a segment read instruction, and sent to the segment identification unit 119. Similarly, "Get_Sports+" is judged as a segment set read instruction, and sent to the segment set identification unit 2119, and "Get_Sports" is judged as a file read instruction, and sent to the file access unit 2502.

The file name output unit 2503 outputs file names for known file management apparatuses. That is to say, the file name output unit 2503 reads file names from the file information storage unit 102 and outputs the read file names.

The file access unit 2502 accesses files for known file management apparatuses. That is to say, the file access unit 2502 refers to the file information stored in the file information storage unit 102 and reads, overwrites, or adds files.

<Operation>

Figure 36:
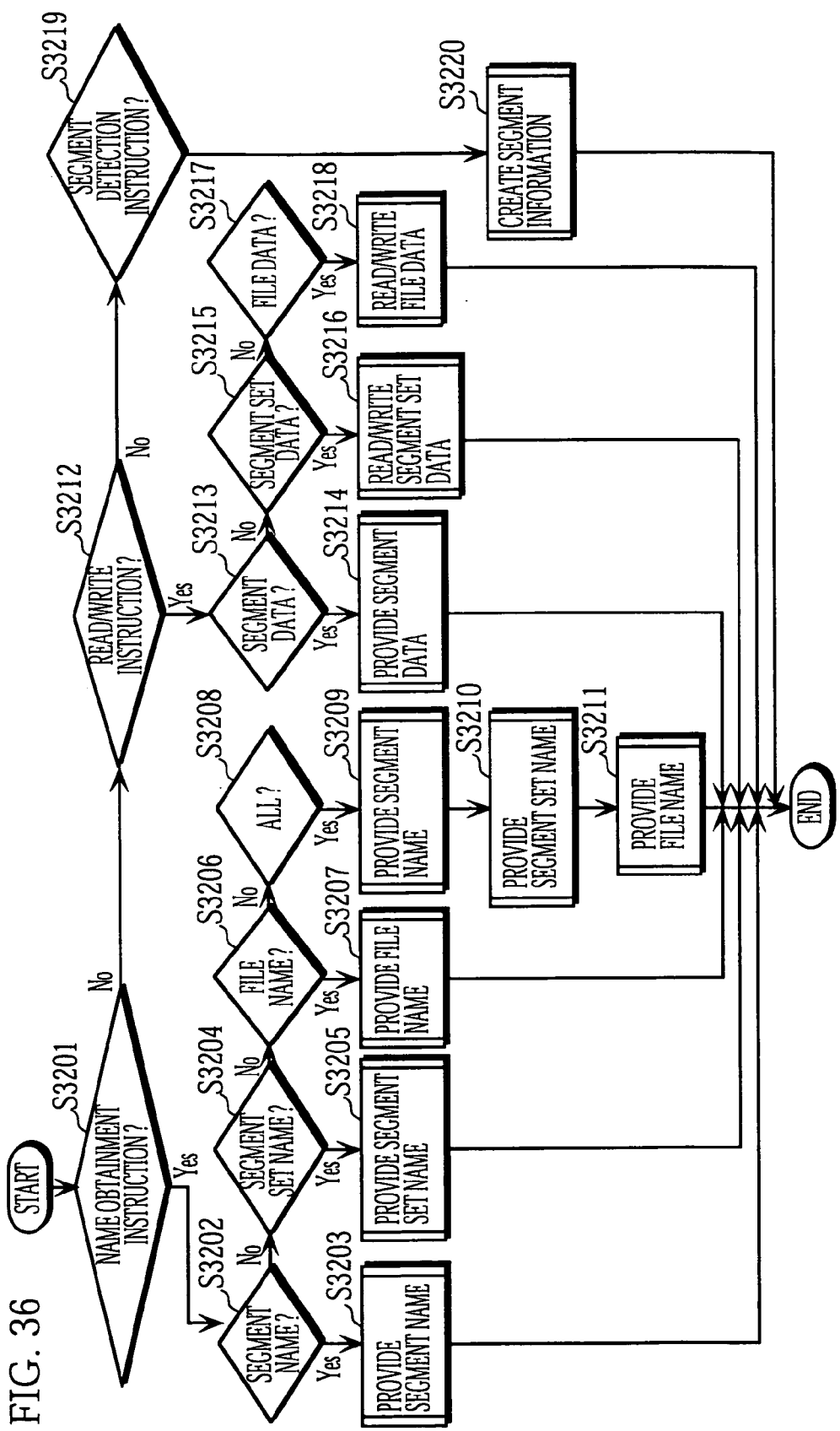
FIG. 36 is a flowchart showing an operation procedure of the file management apparatus in Embodiment 3.

Now, the operation of the file management apparatus of the present embodiment will be described. FIG. 36 is a flowchart showing an operation procedure of the file management apparatus.

A segment name is provided when the input judgement unit 2501 receives a segment name obtainment instruction "Dirseg" from the application unit 2520 (steps S3201, S3202, S3203). A segment set name is provided when the input judgement unit 2501 receives a segment set name obtainment instruction "Dirsegset" (steps S3201, S3204, S3205). A file name is provided when the input judgement unit 2501 receives an instruction "Dir" to obtain a file name, a file name is provided. File, segment, and segment set names are provided when the input judgement unit 2501 receives an instruction "Dirall" to obtain all of a file name, a segment name, and a segment set name (steps S3201, S3208, S3209, S3210, S3211).

Segment data is read or written when the input judgement unit 2501 receives a segment data read instruction (Get_Sports1) or a segment data write instruction (Rec_Quiz1) from the application unit 2520 (steps S3213, S3214).

Segment set data is read or written when the input judgement unit 2501 receives a segment set data read instruction (Get_Sports+), a segment set data overwrite instruction (Rec_Quiz+) (instruction to overwrite segment set data with some data), or a segment set data add instruction (Recadd_Quiz+) (instruction to add some data to segment set data) from the application unit 2520 (steps S3215, S3216).

File data is read or written when the input judgement unit 2501 receives a file data read instruction (Get_Sports) or a file data write instruction (Rec_Quiz) from the application unit 2520 (steps S3217, S3218).

Segment information is created when the input judgement unit 2501 receives an instruction (DetectSeg) to detect a segment from a file, from the application unit 2520 (steps S3219, S3220).

Description of other components has already been done and will be omitted here.

Summary of Embodiment 3

As described above, in the file system of the present embodiment, it is possible to read, overwrite, or add data in units of any of segments, segment sets, and files by specifying the name. Accordingly, the file management apparatus of the present embodiment allows the user to access a target with only one method common to all types of access targets. This reduces the burden on the user.

Embodiment 4

Embodiment 4 relates to a file management apparatus that reads data in units of segment partial sets, where each segment partial set is composed of one or more segments included in a file. The present embodiment is suitable for the case where the user wants to copy or transfer such segments in a file as satisfy a desired condition when the file includes segment portions and other portions, each segment being a logical unit.

<Construction>

Figure 37:
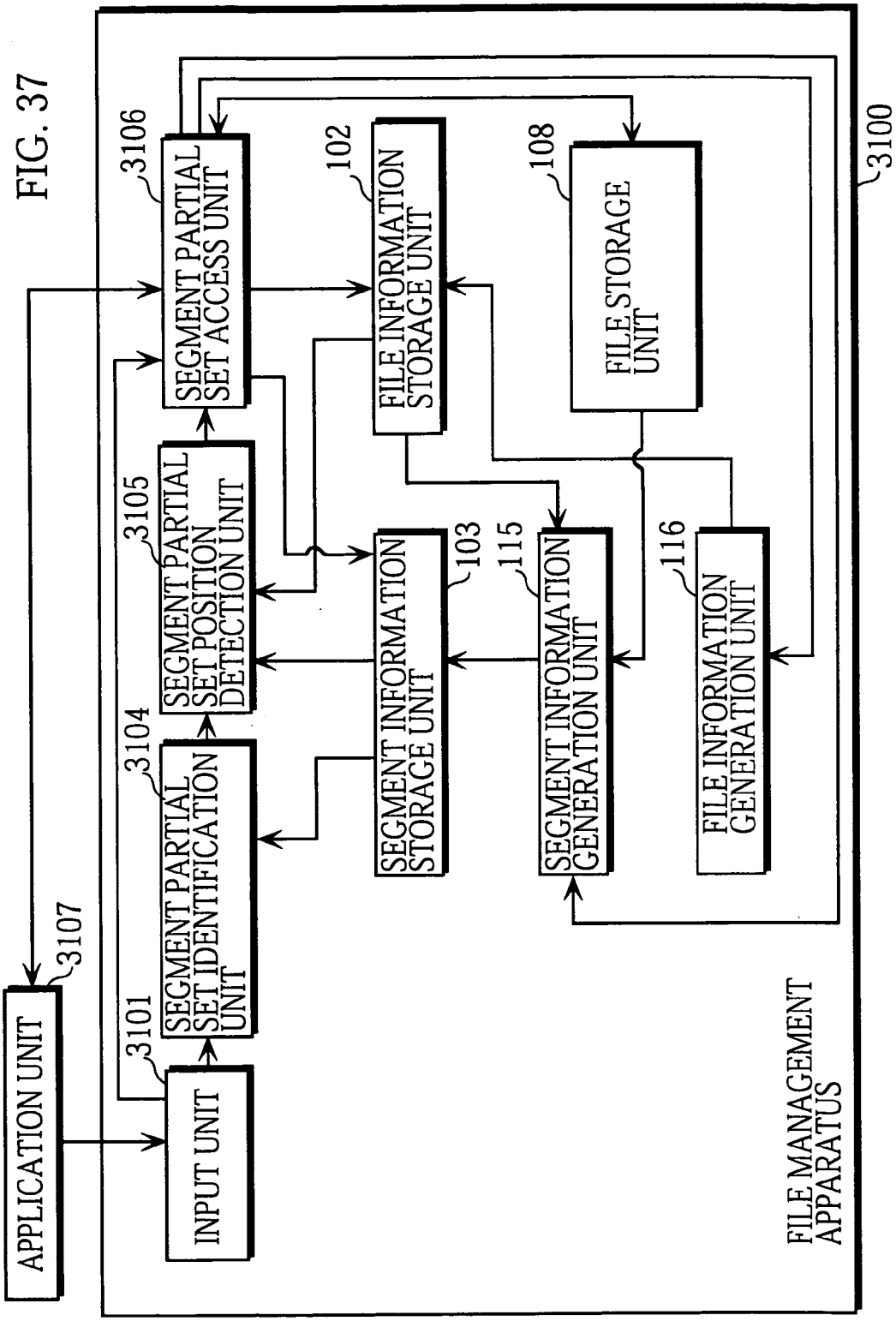
FIG. 37 is a functional block diagram showing the construction of the file management apparatus in Embodiment 4.

FIG. 37 is a functional block diagram showing the construction of the file management apparatus in the present embodiment. The file storage unit 108, file information storage unit 102, file information generation unit 116, segment information storage unit 103, and segment information generation unit 115 of the present embodiment are the same as Embodiment 1. The following is a description of components that are different from Embodiment 1.

The application unit 3107 reads or writes data in units of segment partial sets using the file management apparatus 3100. Here, each segment partial set is a set of segments that satisfy a desired condition, among all the segments of a file.

The input unit 3101 receives a segment partial set data read request specifying a file name and a desired condition.

The segment partial set identification unit 3104 detects, from the segment information storage unit 103, segments that belong to a file having the file name received from the input unit 3101 and satisfy the desired condition, and notifies the segment partial set position detection unit 3105 of the segment numbers of the detected segments which are recognized as a segment partial set.

The segment partial set position detection unit 3105 detects the segment partial set reading position which is identified by the file name and the segment numbers notified by the segment partial set identification unit 3104. More specifically, the segment partial set position detection unit 3105 reads, from the file information storage unit 102, the start address of the file to which the segment partial set belongs. Then, the segment partial set position detection unit 3105 reads, from the segment information storage unit 103, the start address offset and segment length of each segment belonging to the segment partial set, and recognizes a set of ranges of all segments in the segment partial set as the segment partial set reading position, each segment ranging from the start storage position (absolute address) to the end storage position (absolute address).

The segment partial set access unit 3106 reads segment partial set data from the segment partial set reading position in the file storage unit 108, and outputs the read segment partial set to the application unit 3107.

<Reading Segment Partial Set> (Application to FTP Application)

Now, reading of a segment partial set will be described, where it is supposed that the FTP application 610 shown in FIG. 8 is used as the application unit 3107. Suppose that the file storage unit 108 stores the file shown in FIG. 38A, and the segment information storage unit 103 stores the segment information shown in FIG. 38B. FIG. 39 is a flowchart showing a procedure for reading a segment partial set in the present embodiment.

Figure 38:
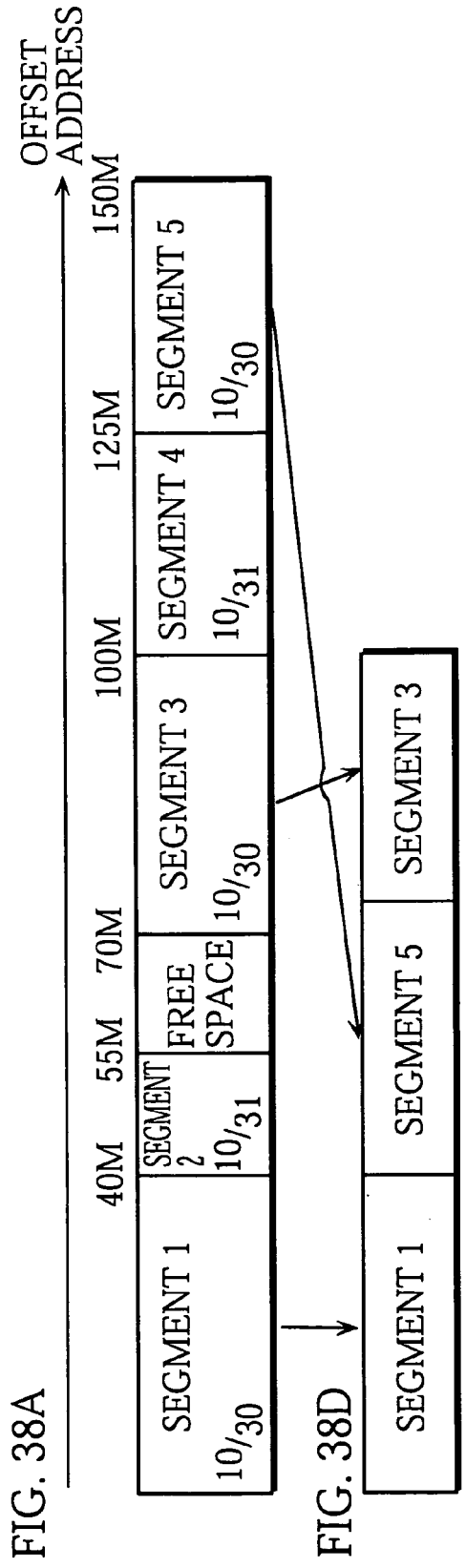
FIG. 38A shows the construction of a file including segments.
FIG. 38B shows the segment information.
FIG. 38C shows the segment partial set data read instruction.
FIG. 38D shows the segment partial set output to the FTP application 610 and stored in the storage unit 604 of the FTP client 600.
Figure 39:
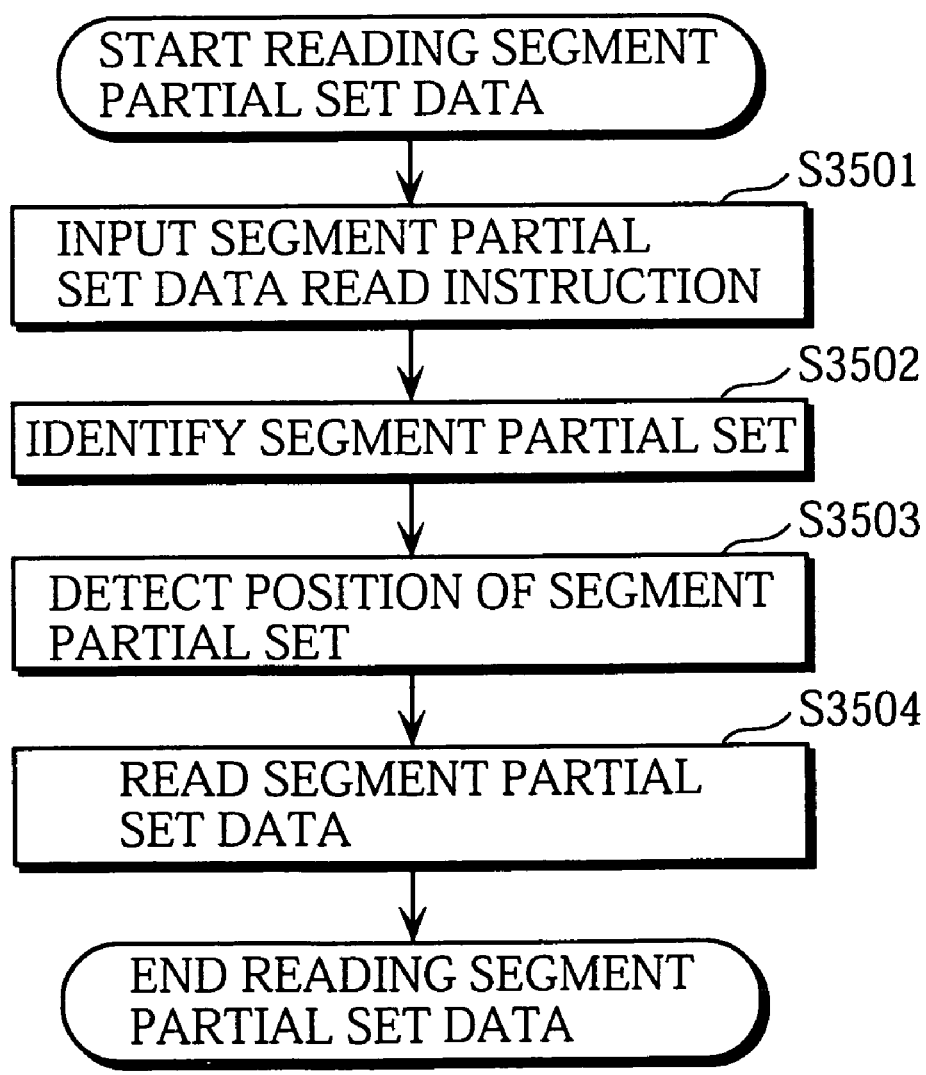
FIG. 39 is a flowchart showing a procedure for reading a segment partial set in Embodiment 4.

After receiving the segment partial set data read instruction (Get_Sports_-T_1999/10/30_-Sort) shown in FIG. 38C, the input unit 3101 sends the received instruction to the segment partial set identification unit 3104 (step S3500).

The segment partial set identification unit 3104 identifies the file (Sports) to which the segment partial set belongs. The segment partial set identification unit 3104 refers to the segment information stored in the segment information storage unit 103 to detect the segments (segments 1, 3, 5) that satisfy the desired condition (that the timecode is 1999/10/30), among the segments belonging to the file (Sports). The segment partial set identification unit 3104 notifies the segment partial set position detection unit 3105 of the file name to which the segment partial set belongs, and also of the segment numbers of the segments belonging to the segment partial set in an ascending order (segment 1, segment 3, segment 5), which is instructed by the specification of the optional code (-Sort) (step S3501).

The segment partial set position detection unit 3105 reads, from the file information storage unit 102, the start address of the file to which the segment partial set belongs. Then, the segment partial set position detection unit 3105 reads, from the segment information storage unit 103, the start address offset and segment length of each segment (segment 1, segment 3, segment 5) belonging to the segment partial set, and recognizes a set of ranges of all segments in the segment partial set as the segment partial set reading position, each segment ranging from the start storage position (absolute address) to the end storage position (absolute address) (step S3503).

The segment partial set access unit 3106 reads segment partial set data from the segment partial set reading position detected in the above step in the file storage unit 108, and outputs the read segment partial set to the FTP application 610. FIG. 38D shows the segment partial set output to the FTP application 610 and stored in the storage unit 604 of the FTP client 600 (step S3504).

Summary of Embodiment 4

As described above, the file management apparatus of the present embodiment enables the user to copy or transfer only the segments that satisfy a desired condition when files include segment portions and other portions.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A file management apparatus for managing files stored therein, comprising:

a file storage unit operable to store a file that contains at least two pieces of data, each piece of data being video data or other data, ach piece of video data containing a piece of numerical information being a time code;

a segment judging unit operable to read a piece of data from the file stored in the file storage it, make a to extract apiece of numerical information being a time code from the read piece of data, and judge whether the piece of numerical information has been extracted from the read piece of data, the segment judging unit further reads another piece of data from the file store in the file storage unit, extracts a piece of numerical information being a time code from said another piece of data, and judges whether the extracted two time codes are continuous in time series; and a segment generating unit operable, if the segment judging unit judges that the piece of numerical information has not been extracted from the read piece of data, to generate a segment composed of piece of video data, each of which contains a piece of numerical information being a time code, that are present in the file until immediately before the read piece of data, the segment generating unit further generates a segment that contains to read two pieces of video data if the segment judging unit judges that the two time codes are continuous, wherein the segment generating includes:

a position information storage unit;

a position obtaining unit operable, if the segment judging unit judges that the two pieces of numerical information are continuous, to obtain two pieces of position information respectively of the two pieces of data from the file storage unit; and a position information write unit operable to, recognizing the two pieces of data as the segment, generate a segment name for identifying the recognized segment, and write into the position information storage unit (ii) the segment name and (ii) the two pieces of position information as an entry that corresponds to the segment name, the two pieces of position information indicating a storage position of the segment, wherein if the segment judging unit judges the two pieces of numerical information are not continuous, the segment generating unit generates a segment that contains one of the read two pieces of data, and generates another segment that contains the other of the read two pieces of data and if the segment judging unit judges that the two pieces of numerical information am not continuous, the position obtaining unit obtains two pieces of position information respectively of the two pieces of data from the file storage unit, and the position information write unit, recognizing the two pieces of data as two different segments, generates two segment names for identifying the two segments, and writes into the position information storage unit (i) the two segment names and (ii) the two pieces of position information as entries that respectively correspond to the two segment names, the two pieces of position information indicating storage positions of the two segment, respectively.

2. The file management apparatus of claim 1 further comprising:

an access request receiving unit operable to receive a segment set access request specifying a segment set name, each segment set being composed of all segments in a file and each segment set name including a name of the file and a character sequence unique to segment set names;

a position information read unit operable to identify a file to which a segment set corresponding to the specified segment set name belongs and read, from the position information storage unit, pieces of position information corresponding to all segments belonging to the identified file, recognizing the read pieces of position information as a piece of position information of the segment set; and a segment set access unit operable to access the segment set in the file storage unit by referring to the piece of position information of the segment set.

3. The file manage ent apparatus of claim 2, wherein each piece of segment position information includes (1) an address indicating a file start storage position of a file to which the segment belongs, and either (2-1) (a) an address offset indicating a size of a portion between the file start and a start of the segment and (b) an address offset indicating a size of a portion between the file start and an end of the segment, or (2—2) (a) an address offset indicating a size of a portion between the file start and a start of the segment and (c) a size of the segment.

4. The file management apparatus of claim 3 further comprising:

a receiving unit operable to receive a segment set name obtainment request;

a segment set name output unit operable to, after the receiving unit receives the segment set name obtainment request, refer to the position information storage unit and output to outside the file management apparatus a list of segment set names which each include (1) a file name of a file to which the segment set belongs and (2) a character sequence unique to segment set names.

5. The file management apparatus of claim 4, wherein each piece of data includes a piece of video data to which a timecode has been assigned; and the segment judging unit judges whether two timecodes assigned to two pieces of video data are continuous.

6. The file management apparatus of claim 1 further comprising:

an access request receiving unit operable to receive an access request specifying an access target name;

a judgment unit operable to judge whether the access target name is a segment set name or a file name, each segment set being a set of all segments included in one file;

a position information read unit operable to read, from either the file storage unit or the position information storage unit, a piece of position information corresponding to the access target name judged by the judgment unit; and an access unit operable to access either a segment set or a file stored in the file storage unit by referring to the read piece of position information.

7. The file management apparatus of claim 6, wherein the judgment unit judges that the access target name is a segment set name when the access target name includes a name of a file stored in the file storage unit and a character sequence unique to segment set names.

8. The file management ap of claim 1 further comprising:

an access request receiving unit operable to receive a segment partial set access request specifying a file name and a condition, each segment partial set being a set of one or more segments in one file;

a position information read unit operable to read, from the position information storage unit, pieces of position information corresponding to all segments belonging to the specified file and satisfying the specified condition, recognizing the read pieces of position information as a piece of position information of the requested segment partial set; and a segment partial set access unit operable to access the segment partial set by referring to the piece of position information of the segment partial set.

9. The file management apparatus of claim 8, wherein each piece of data includes a piece of video data to which a timecode has been assigned, and the segment judging unit judges whether two timecodes assigned to two pieces of video data are continuous.

10. A file management method for use in a file management apparatus for managing files stored therein, comprising:

a file storage step for storing a file that contains at least two pieces of data, each piece of data being video data or other data, each piece of video data containing a piece of numerical information being a time code;

a segment judging step for reading a piece of data from the file stored in the file storage step, making an attempt to extract a piece of numerical information being a time code from the read piece of data, and judging whether the piece of numerical information has been extracted from the read piece of data, the segment judging step, including reading another piece of data from the file stored in the file storage unit, extracting a piece of numerical information being a time code from said another piece of data, and judging whether the two time codes are continuous in time series; and a segment generating step for, if the segment judging step judges that the piece of numerical information has not been extracted from the read piece of data, generating a segment composed of pieces of video data, each of which contains a piece of numerical information being a time code, that are present in the file until immediately before the read piece of data, the segment generating step further generating a segment that contains the read two pieces of video data if the segment judging step results in a judgment that the two time codes are continuous, wherein the file management apparatus further includes a position information storage unit, and the segment generating step includes:

a position obtaining step for, if the segment judging step judges that the two time codes are continuous, obtaining storage positions of the two pieces of video data from the file storage unit; and a position information write step for, recognizing the two pieces of video as a segment, generating a segment name for identifying the recognized segment, and writing into the position information storage unit (i) the segment name and (ii) the two pieces of position information as an entry that corresponds to the segment name, the two pieces of position information indicating storage positions of the segment, wherein if the segment judging step judges that the two time codes are not continuous, the segment generating step generates a segment that contains one of the read two pieces of video data, and generates another segment that contains the other of the read two pieces of video data, wherein if the segment judging step judges that to two time codes a not continuous, the position obtaining step obtains storage positions of the to pieces of video data from the file storage unit, and the position information write step, recognizing the two pieces of video data as two different segments, generates two segment names for identifying the two segments, and writes into the position information storage unit (i) the two segment names and (ii) the two pieces of position information as entries that respectively correspond to the two segment names, the two pieces of position information indicating storage positions of the two segments, respectively.

11. A computer-readable recording medium that stores a file management program for use in a file management apparatus for managing files stored therein, the file management program comprising:

a file storage step for storing a file that contains at least two pieces of data, each piece of data being video data or other data, each piece of video data containing a piece of numerical information being a tine code;

a segment judging step for reading a piece of data from the file stored in the file storage step, making an attempt to extract a piece of numerical information being a time code from the read piece of data, and judging whether the piece of numerical information has been extracted from the read piece of data, the segment step including reading another piece of data from the file stored in the file storage unit, extracting a piece of numerical information being a time code from said another piece of data, and judging whether the two time codes are continuous in time series; and a segment generating step for, if the segment judging step judges that the piece of numerical information has not been extracted from the read piece of data, generating a segment composed of pieces of video data, each of which contains a piece of numerical information being a time code, that are present in the file until immediately before the read piece of data, the segment generating step further generating segment that contains the read two pieces of video data if the segment judging step results in a judgment that the two time codes are continuous, wherein the file management apparatus further includes a position information storage unit, and the segment generating step includes:

a position obtaining step for, if the segment judging step judges that the two time codes are continuous, obtaining storage positions of the two pieces of video data from the file storage unit; and a position information write step for, recognizing the two pieces of video data as a segment, generating a segment name for identifying the recognized segment, and writing into the position information storage unit (i) the segment name and (ii) the two pieces of position information as an entry that corresponds to the segment name, the two pieces of position information indicating storage positions of the segment, wherein if the segment judging step judges that the two time codes are not continuous, the segment generating step generates a segment that contains one of the read two pieces of video data, and generates another segment that contains the other of the read two pieces of video data, wherein if the segment judging step judges that the two times codes are not continuous, the position obtaining step obtains storage positions of the two pieces of video data from the file storage unit, and the position information write step, recognizing the two pieces of video data as two different segments, generates two segment names for identifying the two segments, and writes into the position information stage unit (i) the two segment names and (ii) the two pieces of position information as entries that respectively correspond to the two segment names, the two pieces of position information indicating storage positions of the two segments, respectively.

* * * * *

UNITED STATES PATENT AND TRADEMARK OFFICE
CERTIFICATE OF CORRECTION

PATENT NO. : 7,020,664 B1
APPLICATION NO. : 09/723972
DATED : March 28, 2006
INVENTOR(S) : Tomoko Yamaguchi et al.

It is certified that error appears in the above-identified patent and that said Letters Patent is hereby corrected as shown below:

In Claim 1, Column 34, line 58, "ach" should be "each".
In Claim 1, Column 34, line 61, "it" should be "unit".
In Claim 1, Column 34, line 61, "a" should be "an attempt".
In Claim 1, Column 34, line 62, "apiece" should be "a piece" (two words).
In Claim 1, Column 34, line 66, "store" should be "stored".
In Claim 1, Column 35, line 14, the word "unit" should be inserted between "generating includes".
In Claim 1, Column 35, line 24, "(ii)" should be "(i)".
In Claim 1, Column 35, line 35, "am" should be "are".
In Claim 2, Column 35, line 54, a comma should be inserted after "file".
In Claim 2, Column 35, line 59, a comma should be inserted after "belongs".
In Claim 3, Column 36, line 1, "manage ment" should be one word "management".
In Claim 3, Column 36, line 8, "(2--2)" should have only one short dash to read "(2-2)".
In Claim 8, Column 36, line 50, "ap" should be "apparatus".
In Claim 10, Column 37, line 52, "to" should be "the".
In Claim 10, Column 37, line 53, "a" should be "are".
In Claim 10, Column 37, line 54, "to" should be "two".
In Claim 11, Column 38, line 8, "tine" should be "time".
In Claim 11, Column 38, line 27, "a" should be inserted between "generating segment".
In Claim 11, Column 38, line 50, "times" should be "time".

Signed and Sealed this

Fifteenth Day of August, 2006

JON W. DUDAS
*Director of the United States Patent and Trademark Office*